(12) United States Patent
Tumwattana

(10) Patent No.: US 10,289,301 B2
(45) Date of Patent: May 14, 2019

(54) GESTURE-BASED SELECTION AND MANIPULATION METHOD

(71) Applicant: Changwat Tumwattana, Hong Kong (HK)

(72) Inventor: Changwat Tumwattana, Hong Kong (HK)

( * ) Notice: Subject to any disclaimer, the term of this patent is extended or adjusted under 35 U.S.C. 154(b) by 7 days.

(21) Appl. No.: 15/861,856

(22) Filed: Jan. 4, 2018

(65) Prior Publication Data

US 2018/0136834 A1 May 17, 2018

Related U.S. Application Data

(63) Continuation-in-part of application No. 14/929,337, filed on Oct. 31, 2015, now Pat. No. 9,891,812, which is a continuation-in-part of application No. 14/027,186, filed on Sep. 14, 2013, now Pat. No. 9,176,657.

(51) Int. Cl.
*G06F 3/0488* (2013.01)
*G06F 3/0485* (2013.01)
*G06F 3/0482* (2013.01)

(52) U.S. Cl.
CPC ........ *G06F 3/04883* (2013.01); *G06F 3/0482* (2013.01); *G06F 3/0485* (2013.01)

(58) Field of Classification Search
CPC .................................................. G06F 3/04883
USPC ...................................................... 715/810
See application file for complete search history.

(56) References Cited

U.S. PATENT DOCUMENTS

| | | | | |
|---|---|---|---|---|
| 8,375,336 | B2 * | 2/2013 | Matthews | G06F 3/0488 715/863 |
| 8,799,828 | B2 * | 8/2014 | Song | G06F 3/04883 715/784 |
| 8,984,436 | B1 * | 3/2015 | Tseng | G06F 1/1624 715/786 |
| 9,015,639 | B2 * | 4/2015 | Yoo | G06F 3/0482 715/863 |
| 9,024,895 | B2 * | 5/2015 | Yang | G06F 3/041 178/18.03 |
| 9,043,733 | B2 * | 5/2015 | Chung | G06F 3/0488 345/157 |
| 9,176,657 | B2 * | 11/2015 | Tumwattana | G06F 3/0485 |
| 9,383,910 | B2 * | 7/2016 | Hanumara | G06F 3/0481 |
| 9,891,812 | B2 * | 2/2018 | Tumwattana | G06F 3/0488 |
| 2016/0054887 | A1 * | 2/2016 | Tumwattana | G06F 3/0488 715/810 |

\* cited by examiner

*Primary Examiner* — William D Titcomb

(57) ABSTRACT

A method for deleting at least one content item in a list of content items is presented. In an embodiment, the method first displays a list of content items along the first direction on a display of the computing device. Then, the method detects a first portion of gesture for selecting a first content item in the list of content items, the first portion being a drag orthogonal to the first direction. While the first content item is selected, the method detects a second portion of the gesture, and then marks the at least one content item for deletion, the second portion of the gesture being a drag in an opposite direction to that of the first portion. The content item is then deleted once the gesture is complete. A method for simultaneously editing a parameter of at least one content item in a list of content items is also disclosed.

12 Claims, 27 Drawing Sheets

GESTURE-BASED SELECTION AND MANIPULATION METHOD

CROSS REFERENCE TO RELATED APPLICATIONS

This application is a continuation-in-part application of US application having a serial number of Ser. No. 14/929,337 filed on 31 Oct. 2015, which is a continuation-in-part application of US application having Ser. No. 14/027,186 filed on 14 Sep. 2013, now U.S. Pat. No. 9,176,657, the entireties of which is incorporated herein by reference.

FIELD OF INVENTION

The present invention relates to gesture-based operations in electronic devices with display, in particular gesture-based selection and manipulation methods on a list of selectable content items displayed on such devices.

BACKGROUND OF INVENTION

Many programs in computing devices such as personal computers or smart phones feature editable content items displayed in the form of a list. A lot of times, selection of such items has to be done individually for each item, such as by checking a checkbox or tapping on the item. Such selection methods are prone to errors in both user side and machine side, and are not reliable and convenient to use, especially when a large number of items are to be selected. Therefore a simpler and more intuitive method for selecting multiple items at a time is desired to improve the efficiency of the user interacting with the content items.

Furthermore, removal of a content item from a list typically involves tap selecting the item followed by checking a checkbox, or swiping the item in a single certain direction. However, such methods may cause confusion to the user due to similarity with other operations such as the operation for selecting an item. Therefore a new simple and intuitive way of removing an item while being easy for the user to manipulate and distinguish from other operations is desired.

SUMMARY OF INVENTION

In light of the foregoing background, an aspect of the present invention is a method for selecting multiple content items in a list of scrollable content items. In an embodiment, the method first displays a list of content items scrollable along a first direction on a display of the computing device. Then, the method detects a first portion of gesture for selecting a first content item in the list of content items. While the first content item is selected, the method detects a trigger for a second portion of the gesture, and then selects at least one second content item based on a remainder of the second portion of the gesture. The trigger for the second portion of the gesture is a scroll gesture, and while the first content item is selected the scrolling of the list is disabled.

In an exemplary embodiment, the first portion of the gesture is a drag substantially orthogonal to the first direction, and in another exemplary embodiment the second portion of the gesture is a drag substantially parallel to the first direction. That means the first portion of the drag is substantially orthogonal to the second portion of the gesture.

In another aspect of the present invention, a method of manipulating a plurality of content items in a list of content items is presented. In an embodiment, the method first displays a list of content items along a first direction on a display of a computing device. A plurality of content items in the list of content items are selected, and each content item has a parameter value in a parameter field. The method then detects a multi-input gesture relative to the selected content items, and determines a direction and displacement of each input of the multi-input gesture. Based on the direction and displacement, the parameter values of the selected content item changes by an amount of change.

In different embodiments, the multi-input gesture can be a multiple drag gesture, a spread gesture or a pinch gesture. In different embodiments, the parameter values of the selected content items can shift by a same amount, or spread out or converge such that the parameter values of the content items changes in a way where a difference between adjacent content items increase or decrease across the selected content items.

In another aspect of the present invention, a method for deleting a content item from a list of scrollable content items is provided. The method first displays a list of content items scrollable along a first direction on a display of the computing device. Then, the method detects a first portion of gesture for selecting a first content item in the list of content items. While the first content item is selected, the method detects a trigger for a second portion of the gesture, and then deletes the first content item upon detecting the trigger for the second portion of the gesture. The first portion of the gesture is a drag substantially orthogonal to the first direction, while the second portion of the gesture is a drag substantially opposite to the first portion of the gesture.

In a further embodiment, the method further comprises the step of detecting a third portion of the gesture after the first portion but before the second portion. The third portion of the gesture selects a plurality of content items in the list of content items.

In another aspect of the invention, a method for simultaneously editing a parameter of at least one content item in a list of content items is disclosed. The method comprises the steps of displaying a list of content items on a display of a computing device, said list of content items comprising a plurality of content items arranged in a first direction, each said content item comprises a first parameter where said first parameter of the list of content items is displayed in an aligned configuration, said first parameter is initially not editable; detecting a selection of at least one of said plurality of content items; overlaying an indication layer on top of said displayed first parameters of said list of content item, wherein said first parameter of said at least one selected content item is flagged as editable upon overlaying of said indication layer; and detecting a drag gesture initiated on said first parameter of said at least one selected content item. The method edits said first parameter of said at least one selected content item simultaneously upon completion of said drag gesture.

This method of selection provides many advantages over the existing methods. First, the entire selection operation, regardless of the number of items to be selected, can be completed in one single motion of a single finger. This method is much more convenient than existing methods where content items has to be selected individually using one gesture for each content item. The selection is also intuitive to the user as the user only needs to drag his finger over the desired content items to select them.

The manipulating method of the present invention is also convenient for the user to change multiple parameter values at one time, such as times for reminders. This is especially useful in situations where sometimes the parameter values need to be changed relative to another content item.

The deletion method of the present invention provides an alternate means of deleting a content item that remains intuitive enough while being substantially distinct from the above selection gesture. The deletion method can be combined with the selection method into a single gesture for even greater convenience for the user. The deletion and selection method do not take up any space on the display and are easy to manipulate.

BRIEF DESCRIPTION OF DRAWINGS

FIG. 1 is a block diagram showing a device where the method according to the present invention can be implemented in.

DETAILED DESCRIPTION OF EMBODIMENTS

Figure 1:
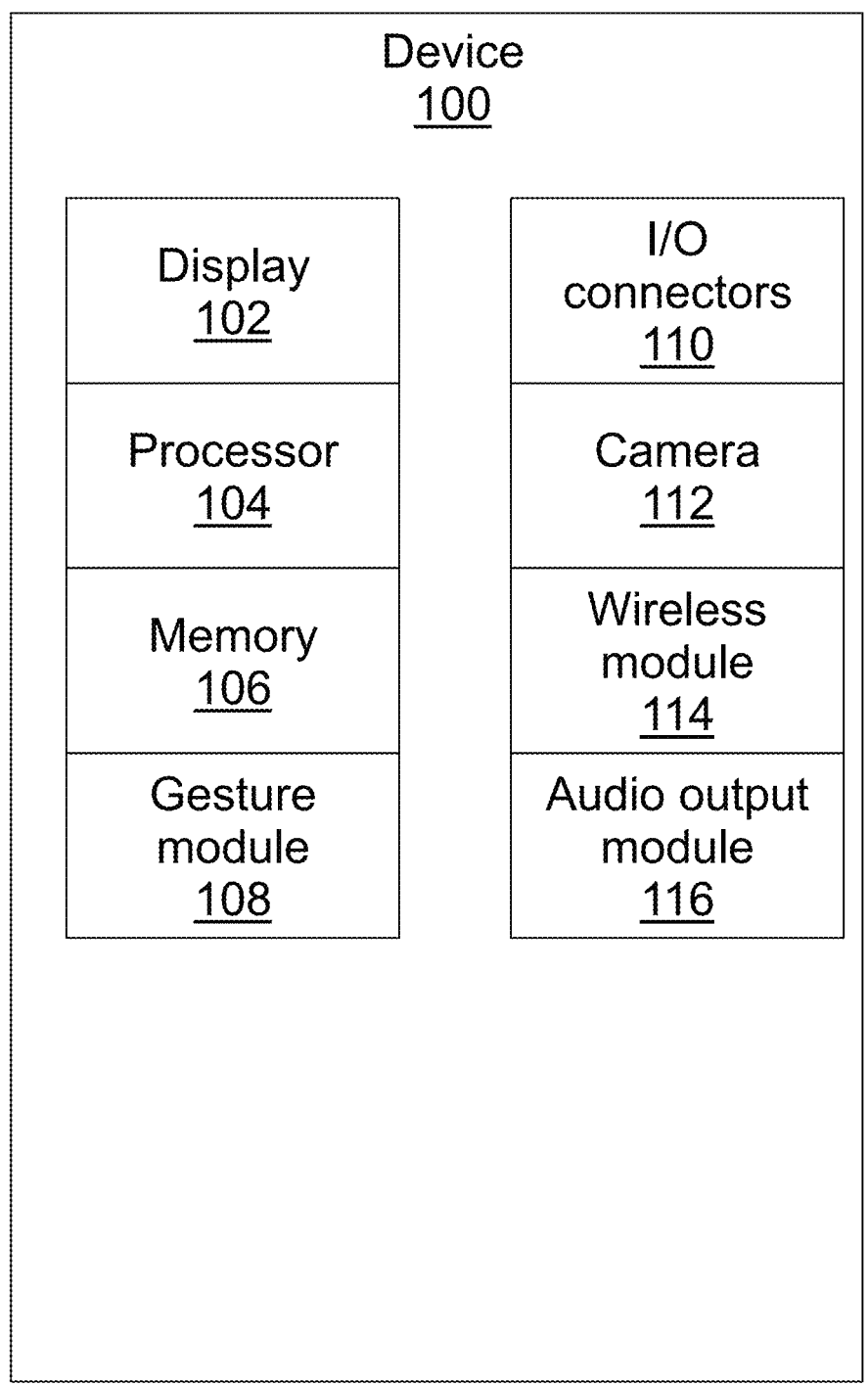

Embodiments of the present invention are described below using a computing device as example, such as one having the structure as shown in FIG. 1. The computing device (or device) 100 comprises a display 102, a processor 104, a memory 106, and a gesture module 108 that allows the device 100 to recognize gestures made by a user on its own or combining with other components. In an embodiment of the mobile device 100, the display 102 is a touch-sensitive display or touchscreen that is capable of detecting a user touching the display 102 by a finger, a stylus pen, or other appropriate devices. The gesture module 108 then analyzes the input to the display 102 to recognize the gesture made by the user. The touch-sensitive display can make use of resistive, capacitive, acoustic wave, infra-red, optical imaging or other technologies. In other embodiments, the gesture module 108 is connected to a sensing module not integrated into the display 102 for non-touch based gesture recognition.

In one embodiment, the processor 104 executes computer-readable instructions stored in memory 106, such as instructions that cause the method of the present invention to be performed. In different embodiments, the computing device 100 also comprises I/O connectors 110 for connecting to external devices such as an external sensing module, one or more cameras 112 for capturing images, a wireless communication module 114 for communication with other computing devices or a server, an audio output module 116 for providing audio output, etc.

Figure 2:
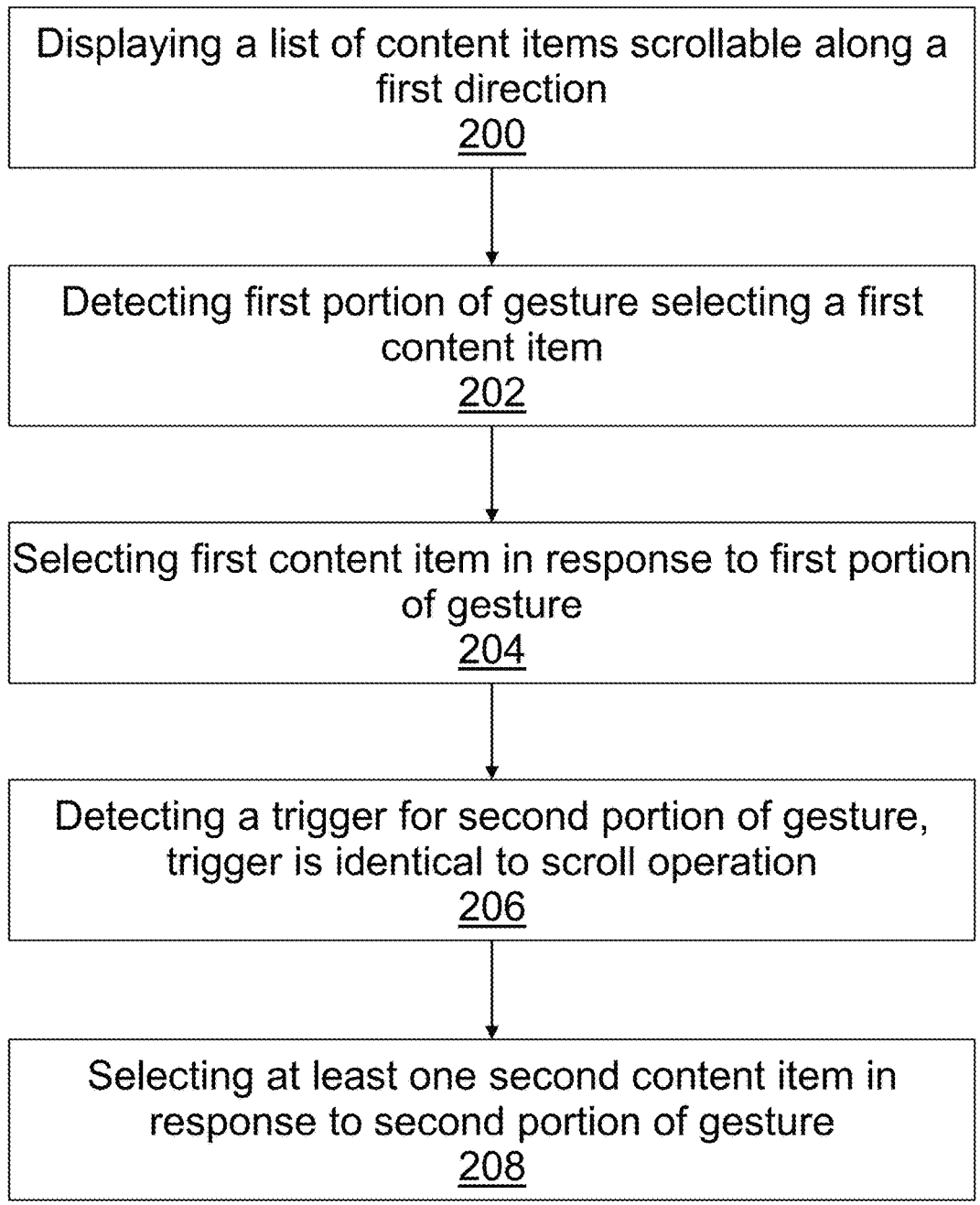
FIG. 2 is a flow diagram of a method for selecting multiple content items according to an embodiment of the present invention.

A first aspect of the present invention is a method for selecting multiple content items in a list of content items. An embodiment of such a method is illustrated in the flow chart as shown in FIG. 2. In step 200, the device displays a list of content items along a first direction such as vertical or horizontal. The content items could be text items, numerical expressions, audio clips, video clips, any other forms of content or a combination thereof as the program supports. Each content item is selectable by the user either individually or as a group.

In an exemplary embodiment, the list of content items is scrollable along the first direction, such as vertical (i.e. up-down). A scroll gesture or a scroll command, such as a single drag in the vertical direction, can be detected by the device to trigger the scroll operation, resulting in some previously undisplayed content items to be displayed on the display screen for example. In a further embodiment, the list of content items is scrollable only along the first direction but not in other directions.

In step 202, the device detects a first portion of a gesture by the user selecting a first content item in the list. For a touch-sensitive display as described above, the gesture is detected by sensing a finger contact on a location corresponding to the first content item, usually right on top of the first content item, or in specifically designated areas on the display screen. For other devices, the location can be a location proximate the first content item, or the finger can be at a point in space that is determined to be pointing at the corresponding location.

In an exemplary embodiment, the first portion of the gesture is a single-finger drag initiated on the first content item and running substantially orthogonal to the first direction. This configuration minimizes the possibility that the select operation being mistaken as a scroll operation, which is a single-finger drag along or substantially parallel to the first direction. In an exemplary embodiment, this gesture is identical to the gesture for selecting a single content item, which means that only the first content item is selected if the gesture is concluded after the first portion, which means that the gesture for selecting multiple content items is an extension of the gesture for selecting a single content item. This feature makes the selection process more intuitive to the user and simplifies the operation of the program.

In various other embodiments, the first portion of the gesture can be multi-finger drag running substantially orthogonal to the first direction, or a single tap, a double tap, a tap-and-hold etc, so long as the first portion of the gesture can be distinguished from a scroll gesture. However, it is more preferred that the select operation is quick and can be performed using a single finger so as to be easily performed while holding the computing device in a hand.

In step 204, the device selects the first content item in response to detecting the first portion of the gesture. In an exemplary embodiment, a buffer is set by the device such that the first content item is deemed selected only if the drag distance or displacement exceeds the buffer. The buffer can be set at around a quarter of the width of the screen or a fixed number of pixels. In various embodiments, the selection of the first content item is indicated to the user by highlighting the selected content item using another color in all or part of the content item, or by shifting the selected content item relative to unselected content items, or by playing a sound effect, or by vibration of the device, or displaying a check mark, or a combination of the above.

While the first content item is selected, in step 206, the device detects a trigger for the second portion of the gesture. It is noted that the finger is not released from the display between the first portion and the second portion of the gesture, meaning that the device regards the two portions of the gesture as a single gesture but not separate gestures, even different portions of the gesture may instruct the device to perform multiple operations. In different embodiments, the device may allow or deny a pause between the first and second portions.

In an exemplary embodiment, the trigger for the second portion of the gesture is identical to a scroll gesture or scroll command along the first direction. In one embodiment, the scroll gesture along the first direction is determined as a drag where the component along the first direction is larger than or equal to the component orthogonal to the first direction. While the first content item is selected and the gesture is not yet completed or concluded, scrolling of the list along the first direction is disabled so the list of content items will stay at the original location, allowing the finger to move over and select at least one second content item, as explained in more detail below.

In step 208, the device selects the at least one second content item based on the second portion of the gesture. In one embodiment, the device first determines whether a next or adjacent second content item in the direction of the second portion of the gesture is present. If present, then the next second content item is determined to be selected when the device determines that the finger moves over to the next second content item. In different embodiments, whether the finger has moved over to the next second content item can be determined by the distance moved along the first direction, or by comparing the present location of the finger and the area occupied by each second content item. For example, when the distance moved is approximately the same as the height of a content item, it is very likely that the finger has moved from one content item to the next content item. Alternatively, when the finger crosses a certain point on the display that is occupied by one content item, the device can also deduce that the finger moves over to the next content item. In one embodiment, a buffer is also employed for the selection of the next second content item. For example, the buffer can be set such as the point of contact is a certain pixels over the boundary of the content item so as to prevent accidental selection of the next item.

In an alternative embodiment, a matrix or table of content items is scrollable in more than one direction, and scrolling in all directions are disabled during a gesture once the first content item is selected. The selection of the first content item can be by a double tap or other gestures that can be distinguished from a scroll gesture for any of the directions.

In another alternative embodiment, the scrolling of the list of content items is disabled when the device detects that the first content item is selected, but is reenabled as the second portion of the gestures reaches an edge of the display screen. This allows the user to select more content items than those displayed in a single gesture.

In an exemplary embodiment, a specific second content item is selected immediately when the second portion of the gesture is determined to move over the content item. In another embodiment, the device detects the gesture is concluded before determining the ending location of the finger, and then selects all content items between the first content item and the one at the ending location simultaneously. In both cases, a continuous sublist of content items is selected by the operation.

Figure 3A:
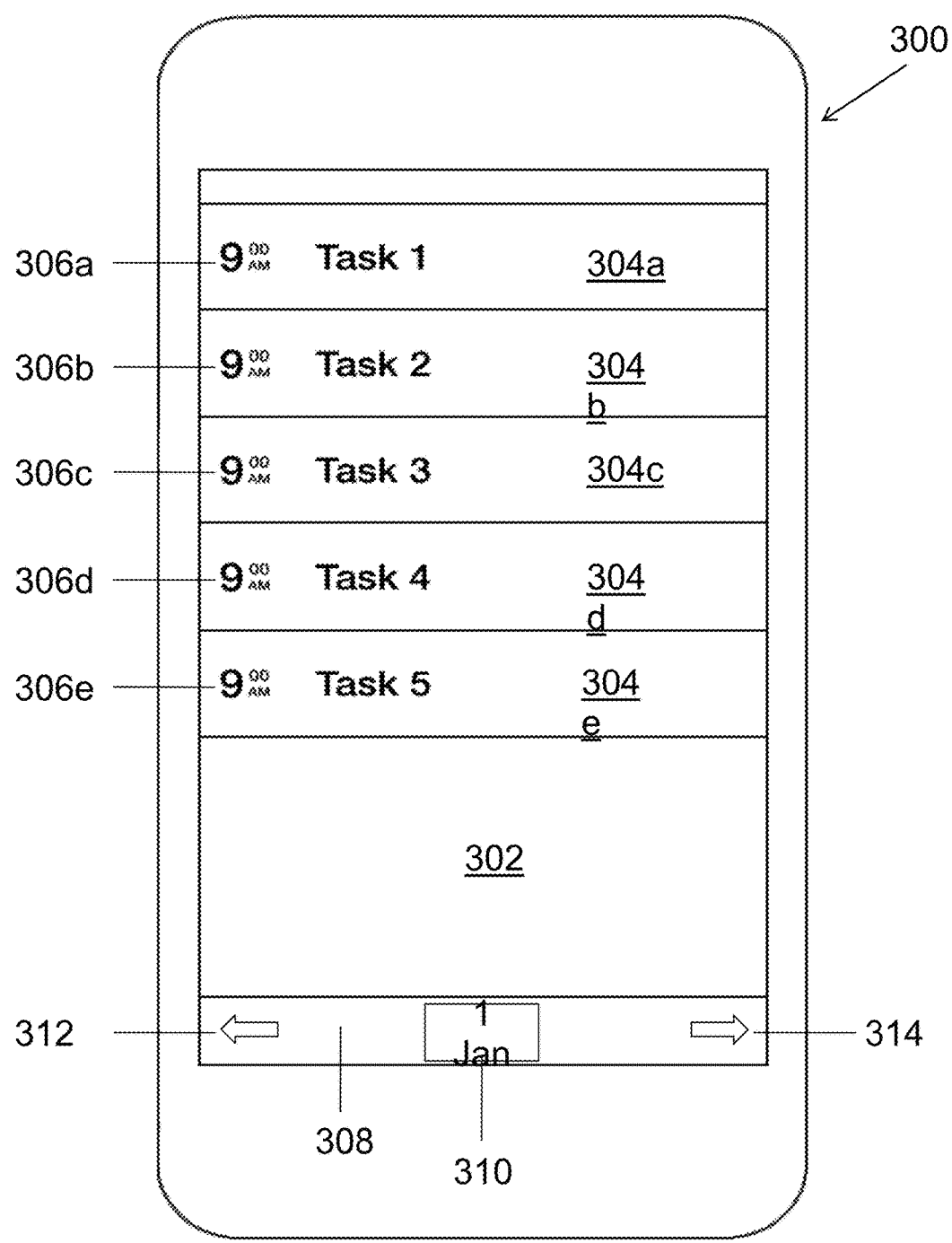
FIGS. 3a-3c illustrates a mobile device in a method for selecting multiple content items according to an embodiment of the present invention.
Figure 3B:
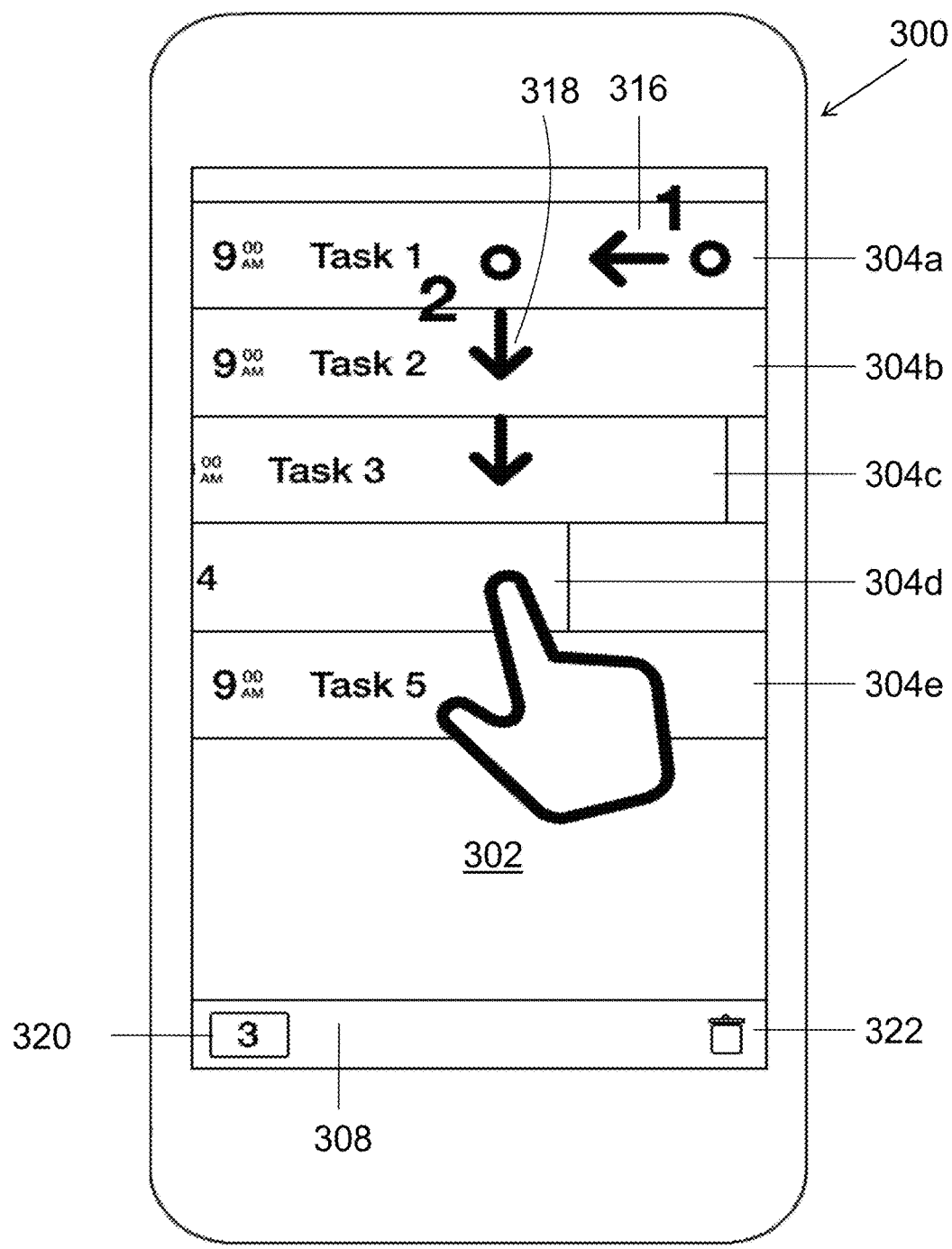
Figure 3C:
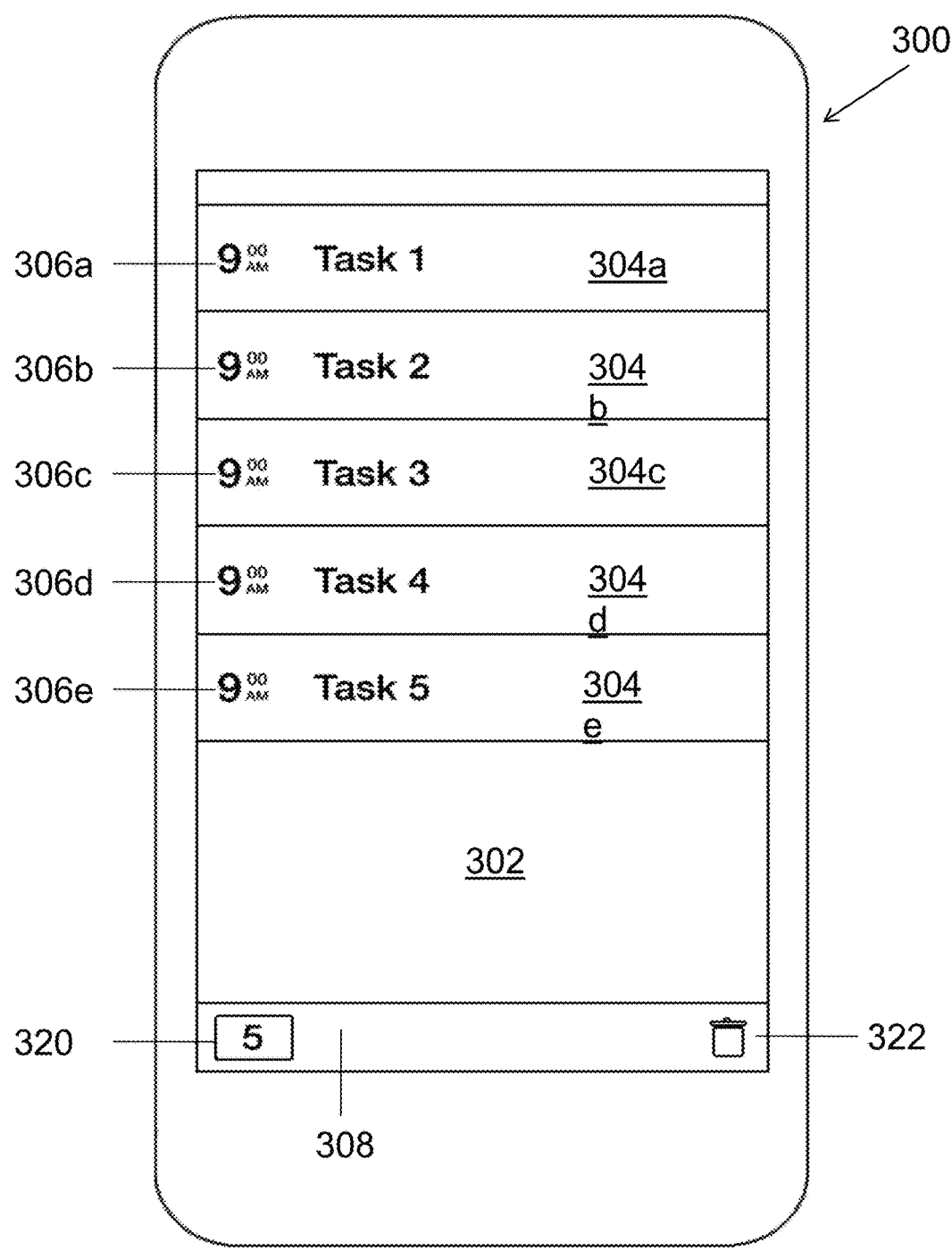

FIG. 3a-3c shows an implementation of the above method in a scheduling app. In FIG. 3a, which is the state before the method starts, device 300 is shown as a smart phone with a touch screen display 302. A list of five content items 304a-304e is displayed along a vertical direction. Each content item 304a-304e comprises a task description (e.g. Task 1) and a time 306a-306e associated to the task description, which are both editable by a user. The content items 304a-304e in the list can be sorted in a chronological order based on the times 306 associated to the task descriptions. A menu bar 308 is displayed at the bottom of the display 302, with a date 310 of the tasks displayed at the center thereof. A left button 312 and a right button 314 are also displayed at the two sides of the date 310 to allow the user to switch to tasks for another date. In one embodiment, an option button (not shown) is displayed instead of the left button 312 to allow the user to configure the settings of the app.

In an exemplary embodiment, the menu bar 308 is a pull-up menu where a calendar is displayed when pulled up. The calendar allows the user to directly switch to a particular date to edit or check the tasks on that date.

In FIG. 3b, the device 300 detects a user selecting a first content item 304a by detecting a first portion of a drag, denoted by arrow 316, at the first content item 304a in a direction substantially orthogonal to the direction of the list, which in this case is horizontal. The direction of drag is shown as left in this figure, but it is understood that a drag to the right can achieve the same effect. Once the distance of the drag exceeds the buffer, which for example can be around a quarter to a half of the width of the screen, the first content item 304a is selected, which can be indicated to the user using visual indications and/or audio indications as mentioned above. In this embodiment, the first content item 304a follows the movement of the finger so the first content item 304a will shift to the left when the drag is to the left.

The device 300 then detects the trigger for the second portion of the gesture, which is a drag that runs downwards, denoted by arrow 318, and travelling over content items 304b, 304c and 304d. When the drag moves overs a content item, the device 300 selects the content item along with the first content item 304a. In an exemplary embodiment, the indication of a content item being selected during the second portion of the gesture is identical to that during the first portion of the gesture. That means content items 304b, 304c and 304d are highlighted with the same color and shifted in the same direction as the first content item 304a. Once the finger moves over to another content item, the previously selected content item will return to its original position. It can be seen in FIG. 3B that content item 304b is already fully returned to its original position while content item 304c is still returning to its original position. Content item 304d shows that the currently selected content item is shifted to the same direction as the first portion of the gesture.

In another embodiment, while the visual indication is the same for all content items, different audio indications can be different for each content item selected. In a specific example, a pitch of the audio indication can change for each content item selected along the list. The pitch can be set such that it follows a major chord or a specific sequence, behaving as if each content item is a key for a musical instrument like a piano.

While the drag is continuing, the information displayed in the menu bar 308 changes. The date 310 is still displayed at the center of the menu bar 308, but at the left of the menu bar 308 is a box 320 showing the number of content items selected. In this embodiment, three content items (304a, 304b and 304c) are deemed as selected, while the selection of content item 304d will only be reflected either when the finger moves to the next content item 304e, or releases from the display. After the selection gesture is concluded, tapping this box 320 will unselect all selected content items simultaneously. A recycle bin icon 322 is also displayed at the right side of the date 310. After the dragging is concluded and the selected content items are finalized, the selected content items can be deleted by the user interacting with the recycle bin icon 322, such as tapping the recycle bin icon 322.

Referring to FIG. 3C, it can be seen that all five content items 304a-304e are selected, as indicated by the number "5" shown in the box 320 in the left hand side of the menu bar 308.

Figure 4:
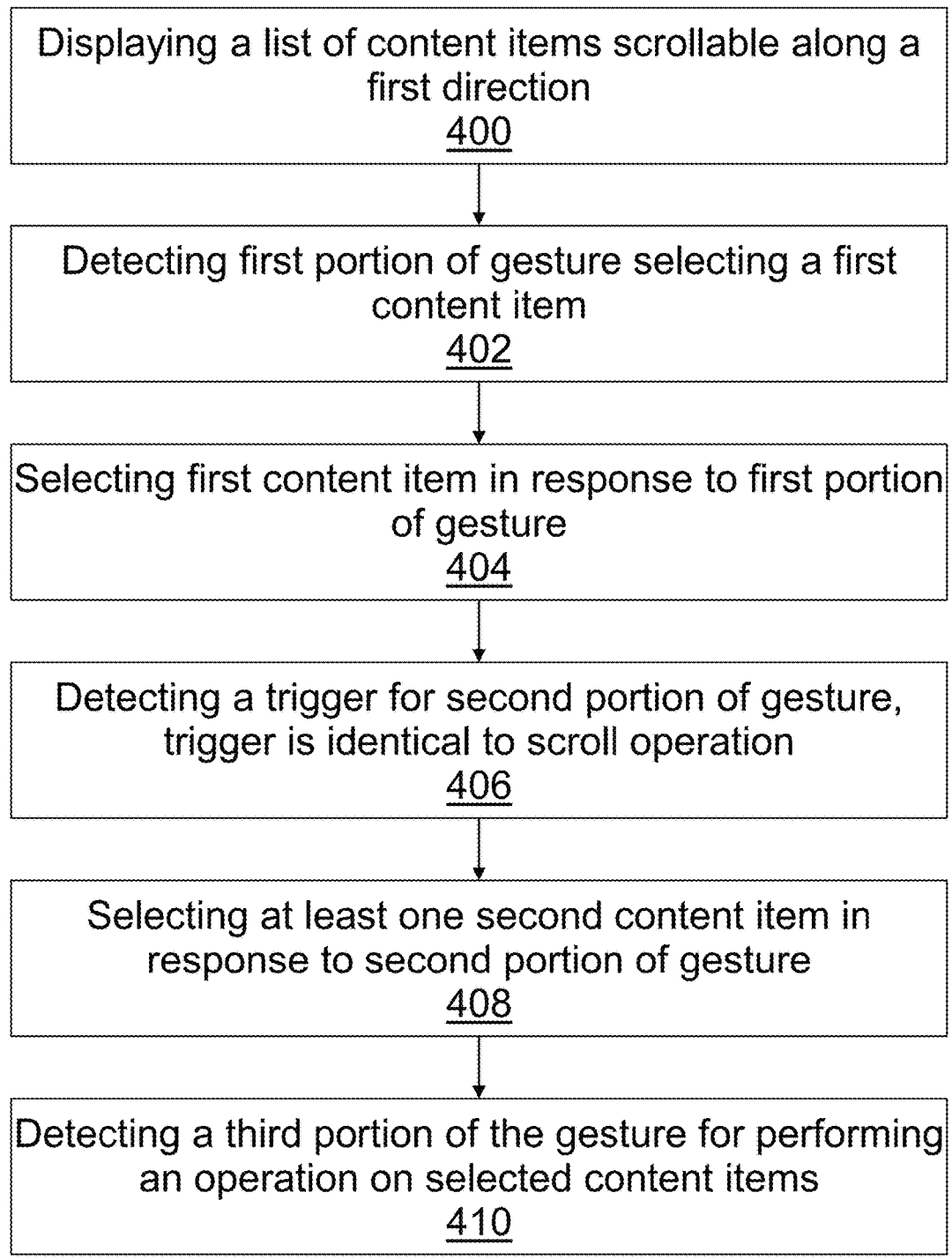
FIG. 4 is a flow diagram of a method for selecting and manipulating multiple content items according to an embodiment of the present invention.

In another embodiment as shown in FIG. 4, the device further detects a third portion of the gesture. Steps 400-408 are identical to steps 200-208 as described above. In step 410, the device detects a third portion of the gesture for performing an operation on the selected content items. In an exemplary embodiment, the second portion of the gesture is entirely a drag substantially parallel to the first direction so that the device can distinguish the third portion of the gesture from the second portion of the gesture by their directionalities. In a further embodiment, the third portion of the gesture has a same directionality than the first portion of the gesture.

Using the example in FIG. 3 above, the third portion of the gesture can be a dragging gesture along the horizontal direction in an embodiment, which is substantially orthogonal to the direction of the list. The third portion can be the in the same or opposite direction as the first portion, and the operation can be deletion of the content items (same as the function of the recycle bin icon 322), highlighting the content items for indicating different levels of importance or priority, grouping the content items together for group editing purposes, or other operations. In another embodiment, the third portion of the gesture is a dragging gesture that starts in the horizontal direction but has a complex trajectory like a circle, a star or a Z-shape, etc. The start in the horizontal direction is needed for distinguishing the third portion from the second portion, and the complex trajectory can increase the number of operations a user can do to the content items using a single motion.

In another embodiment, the third portion of the gesture involves another finger than the one used in the first portion and the second portion of the gesture. For example, when the first portion and the second portion of the gesture is a dragging gesture using a first finger, the third portion of the gesture can be a tap using a second finger, while the first finger is still held at the position of the second content item so that the device detects that the gesture is still not concluded.

If the content items are arranged in a way such that they are completely aligned, such as the arrangement in FIG. 3a, the second portion of the gesture would result in a continuous sublist of content items being selected. In an alternative embodiment, the list of content items has an offset in their horizontal locations, such that the finger can move over some of the content items without crossing over others, allowing the user to select multiple content items that are not necessarily adjacent to each other in one single gesture. In another embodiment, after the content items are selected, individual selected content items can be deselected using operations similar to selecting an individual content item in order to have the desired content items be selected only. Multiple content items can also be deselected by following the same steps as explained above for selecting the content items.

In another embodiment, while the second portion of the gesture is in progress, backtracking of the gesture, or in other words, having the gesture move in an opposite direction to the direction of selection would result in unselection of a selected content item. For example, if the second portion of the gesture is a downward drag, then a upward drag over a content item would unselect the content item.

Figure 5:
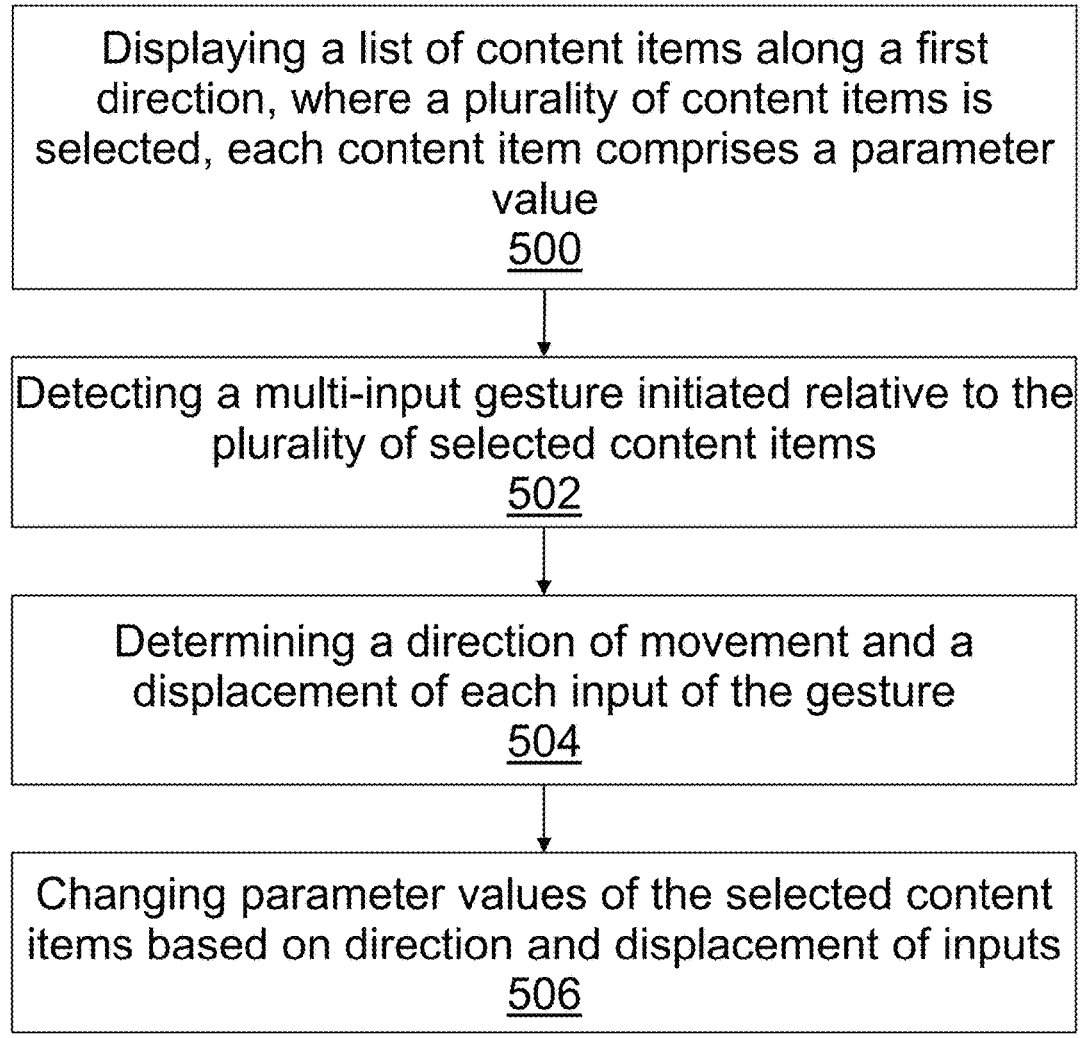
FIG. 5 is a flow diagram of a method for manipulating multiple content items according to an embodiment of the present invention.

FIG. 5 shows a method of editing or manipulating the content items after they are selected, according to an embodiment of the present invention. In step 500, the device displays a list of content items on its display along a first direction, with a plurality of content items in the list being selected. Each content item has a parameter field having a parameter value associated thereto, where the parameter values of the content items are sortable and can be manipulated using alphanumerical operations. Examples of the parameter field include numerals (e.g. 1, 2, 3 . . . ), alphabets (e.g. A, b, c . . . or i, ii, iii . . . ), time (9:00, 10:00, 11:00 . . . ) or other parameter types. The selected content items can be in a continuous list or can be discrete content items. The method of selection can be a method as described above or a conventional selection method, as long as the appropriate content items are selected.

In step 502, the device detects a multi-input gesture being initiated relative to the selected content items. For the purposes of this invention, a multi-input gesture is a gesture where the movements of more than one input is interpreted together by the device as a single gesture. In various embodiments, the multi-input gesture can be initiated anywhere on the selected content items, on a specific selected content item among the selected content items, on the time parameter of the content items, or anywhere on the display screen. The location of initiation can be determined by the location of one of the fingers, or a mid-point of the multiple fingers.

In step 504, the device determines a direction of movement and a displacement of each input of the multi-input gesture. In different embodiments, the directions of movement of the multiple inputs can be substantially parallel, substantially opposite, extending radially outwards or inwards, or rotating in a clockwise or counterclockwise direction. The displacement can be determined by a total distance moved, a net distance moved along a specified direction such as along the first direction, or an angle of rotation.

In step 506, the device changes the parameter values of the content items by an amount of change based on the direction and displacement of each input of the multi-input gesture. In an exemplary embodiment, the direction of each input determines the operation type and therefore how the parameter values should be changed, such as which expression should be used to calculate the amounts of change. In another exemplary embodiment, the magnitude of the amount of change is generally proportional to the displacement of the inputs.

Figure 6A:
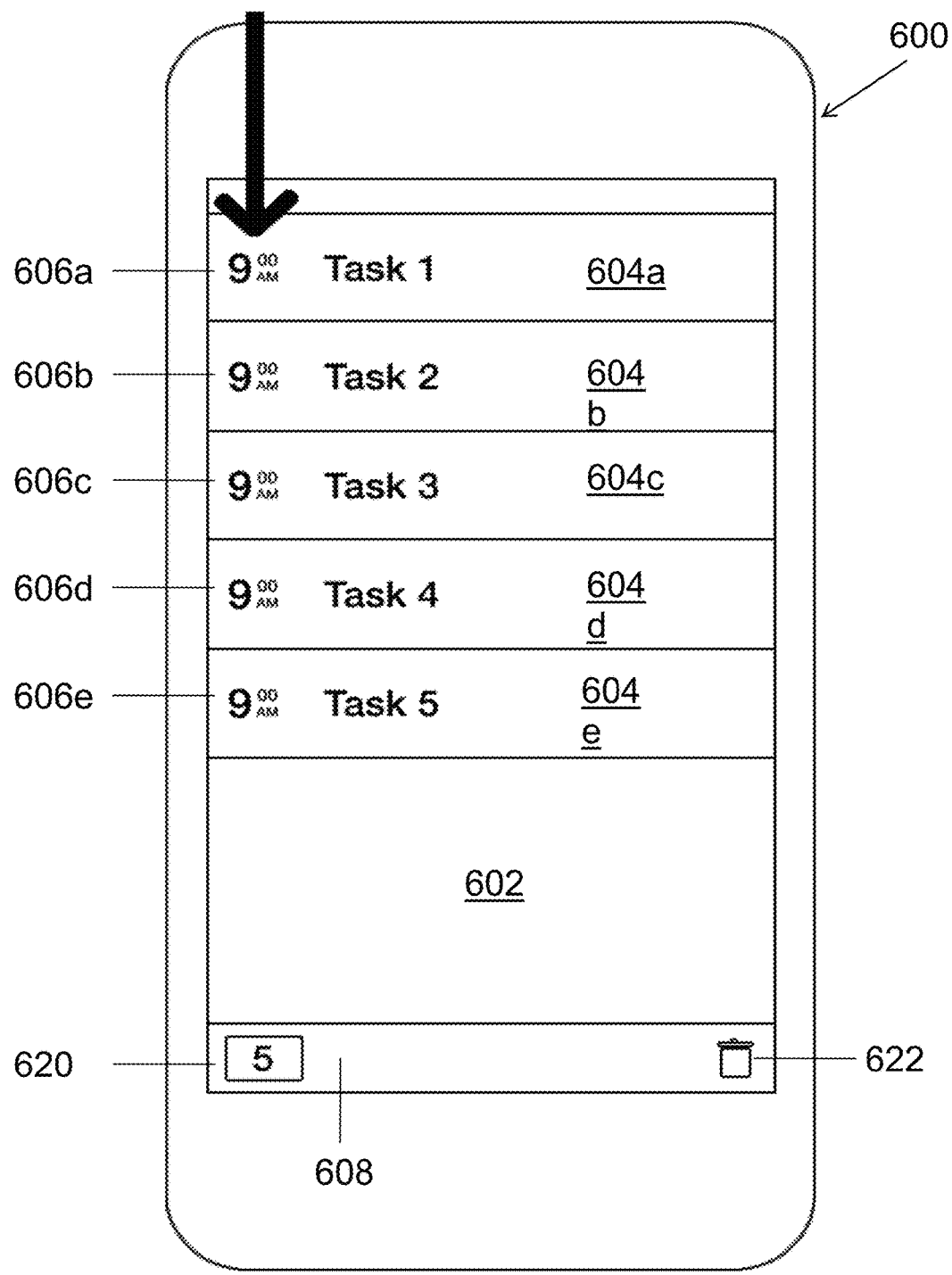
FIG. 6a-6b illustrates a mobile device in a method for manipulating multiple content items according to an embodiment of the present invention.
Figure 6B:
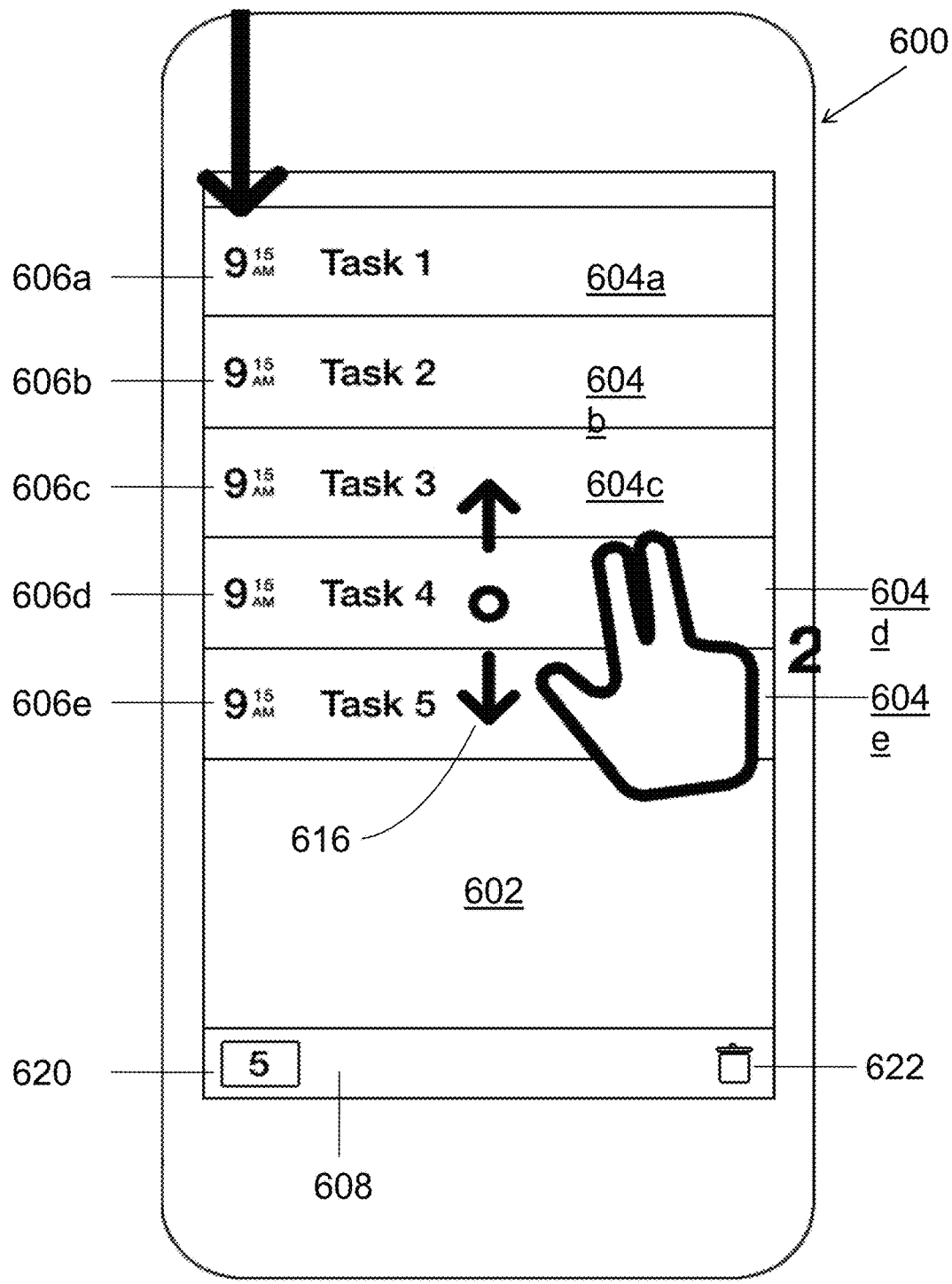
Figure 7:
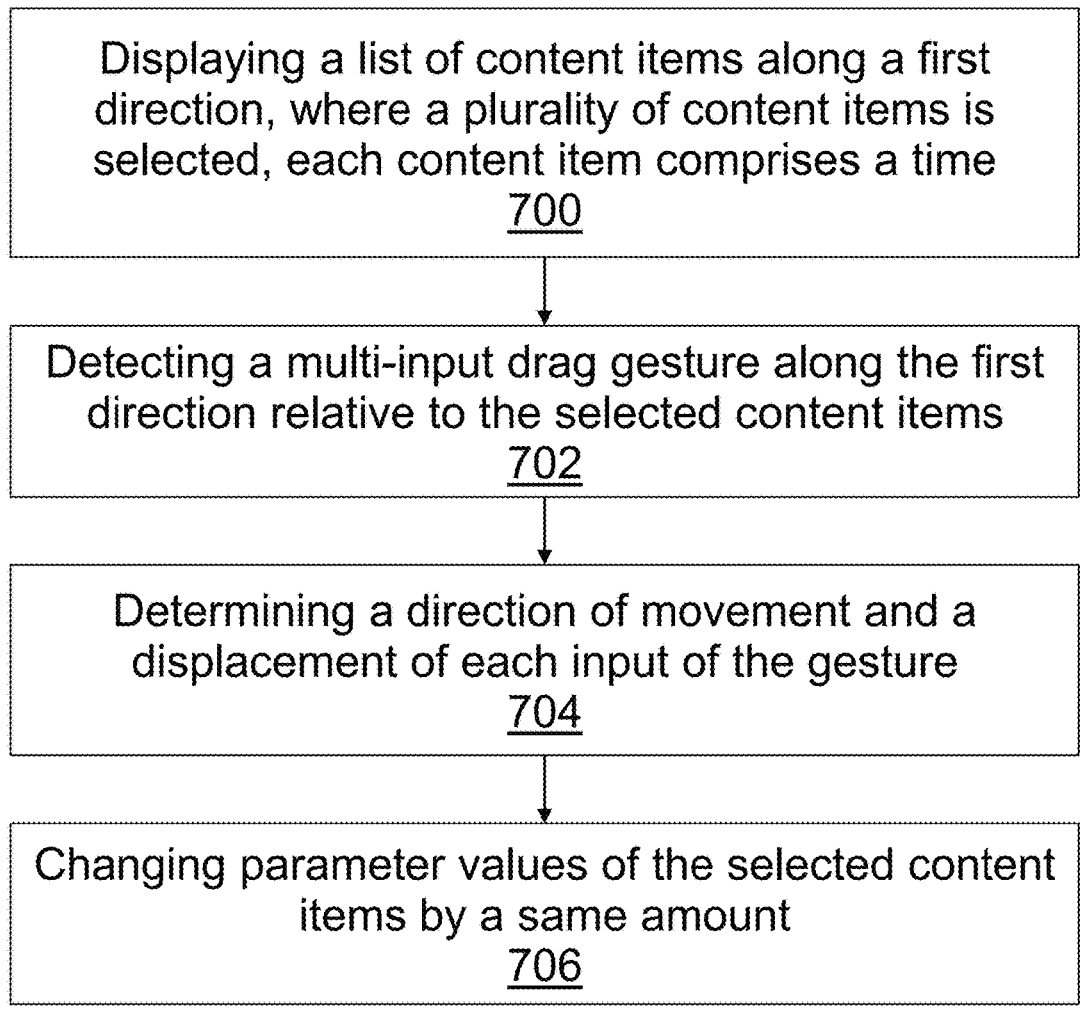
FIG. 7 is a flow diagram of a method for manipulating multiple content items according to an embodiment of the present invention.

FIGS. 6 and 7 show a specific example of the method described above, according to an embodiment of the present invention. In step 700, the device displays a list of content items along the first direction, with a plurality of content items 604a-604e selected as shown in FIG. 6a. Each content item 604a-604e has a task description and also a parameter field having a parameter value 606a-606e. In this specific embodiment, the parameter is shown as a time. As shown in FIG. 6A, the times 606a-606e are all displayed as 9:00 am. The menu bar 608 has a box 620 for indicating the number of content items selected and a recycle box icon 622 for deleting the content items. As indicated by the number "5" in the box 620, all five content items are selected in FIG. 6a.

In step 702, the device detects a multi-finger drag gesture along the first direction relative to the selected content items. A multi-finger drag gesture is defined as more than one finger dragging in a substantially same direction. In step 704, a direction and a displacement of each finger of the multi-finger drag gesture is determined. When the first direction is vertical, the direction of the drag can be up or down, as shown by the arrow 616 in FIG. 6b. The displacement can be determined by an average displacement of the fingers either upwards or downwards.

In step 706, based on the direction and the displacement of each input of the multi-finger drag gesture, the device shifts the times 606a-606e by a same amount. When the drag is downwards, the parameter will increase in value, or in this case, the time is delayed. As shown in FIG. 6B, the times 606a-606e (9:15a.m.) are shifted from the times in FIG. 6A (9:00a.m) by 15 minutes. On the other hand, when the drag is upwards, the times will shift forward. The relationship of the directions of drag and time shift can be changed according to user needs.

In an exemplary embodiment, the amount of change is generally directly proportional to the displacement. That means doubling the displacement would also double the amount of change of the parameter values and vice versa. In another exemplary embodiment, the parameter value 606a-606e increments or decrements in predetermined intervals. For example, in FIG. 6 the interval is set as 5 minutes, 15 minutes, or 1 hour. In various embodiments, the interval is adjustable by a user by a gesture or by configuring the settings before the gesture. Assuming the interval in this example is 15 minutes, FIG. 6B shows that the times 606a-606e is shifted by one interval. If the drag continues and the displacement continues to increase, the times 606a-606e will then change to 9:30a.m., then 9:45a.m, until the gesture is completed.

In an alternative embodiment, the amount of change of the parameter values are further dependent on a hold duration of the gesture. By holding the gesture for a period of time, the amount of change can be increased even if space is limited therefore preventing the displacement to further increase. In a further embodiment, the amount of change only start depending on the hold duration when the fingers already reach the edge of the display.

Figure 8A:
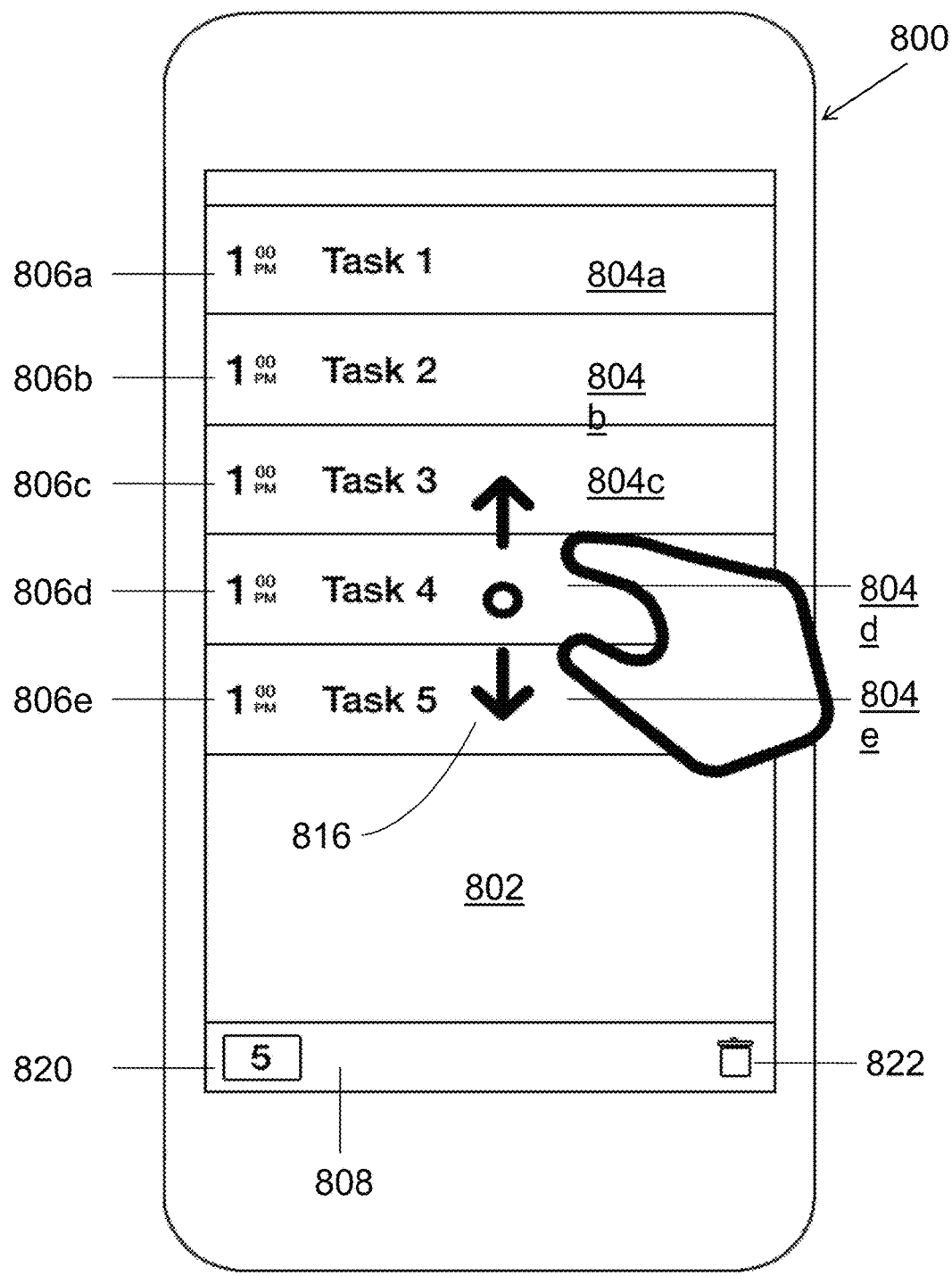
FIG. 8a-8b illustrates a mobile device in another method for manipulating multiple content items according to an embodiment of the present invention.
Figure 8B:
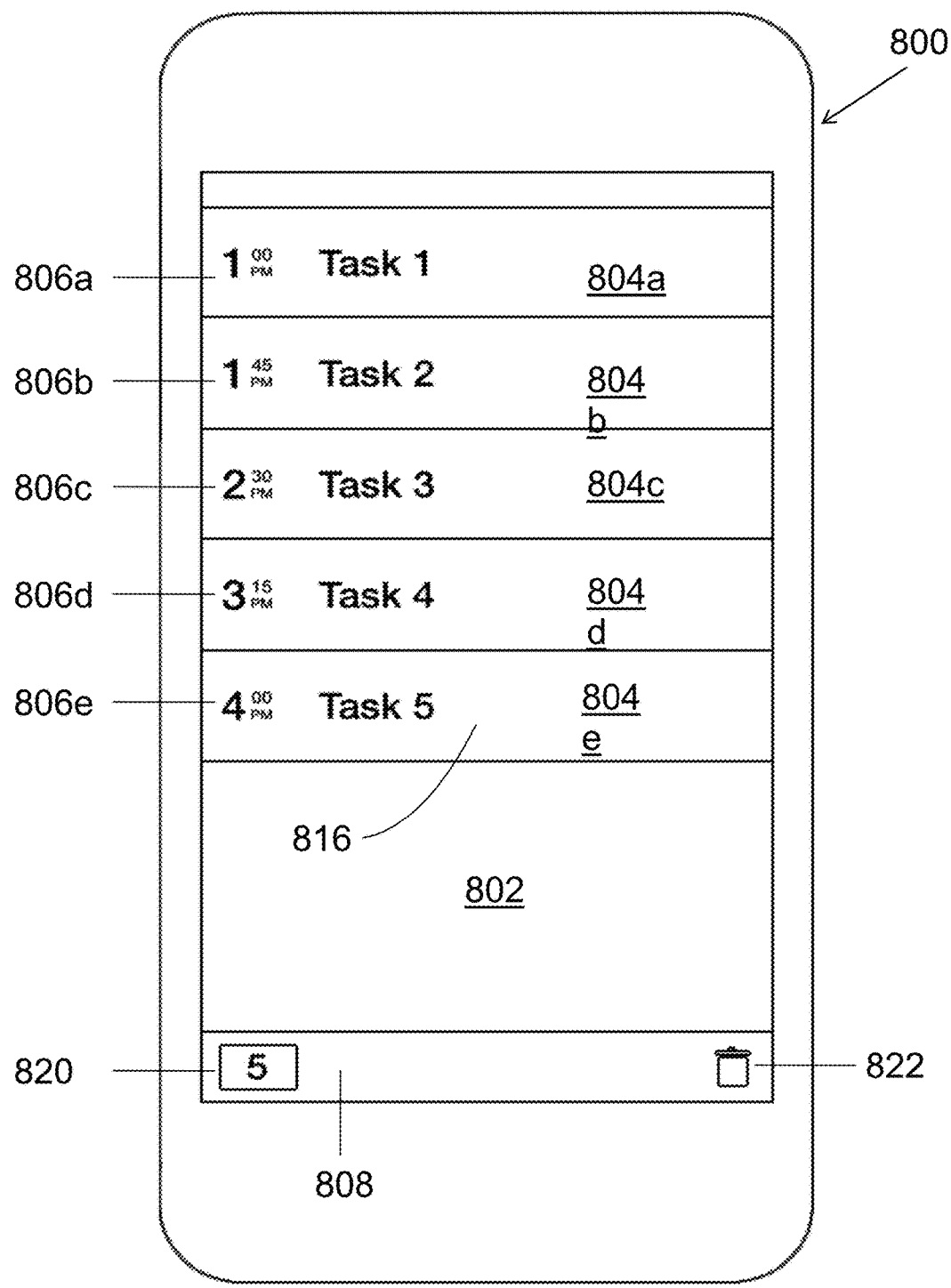
Figure 9:
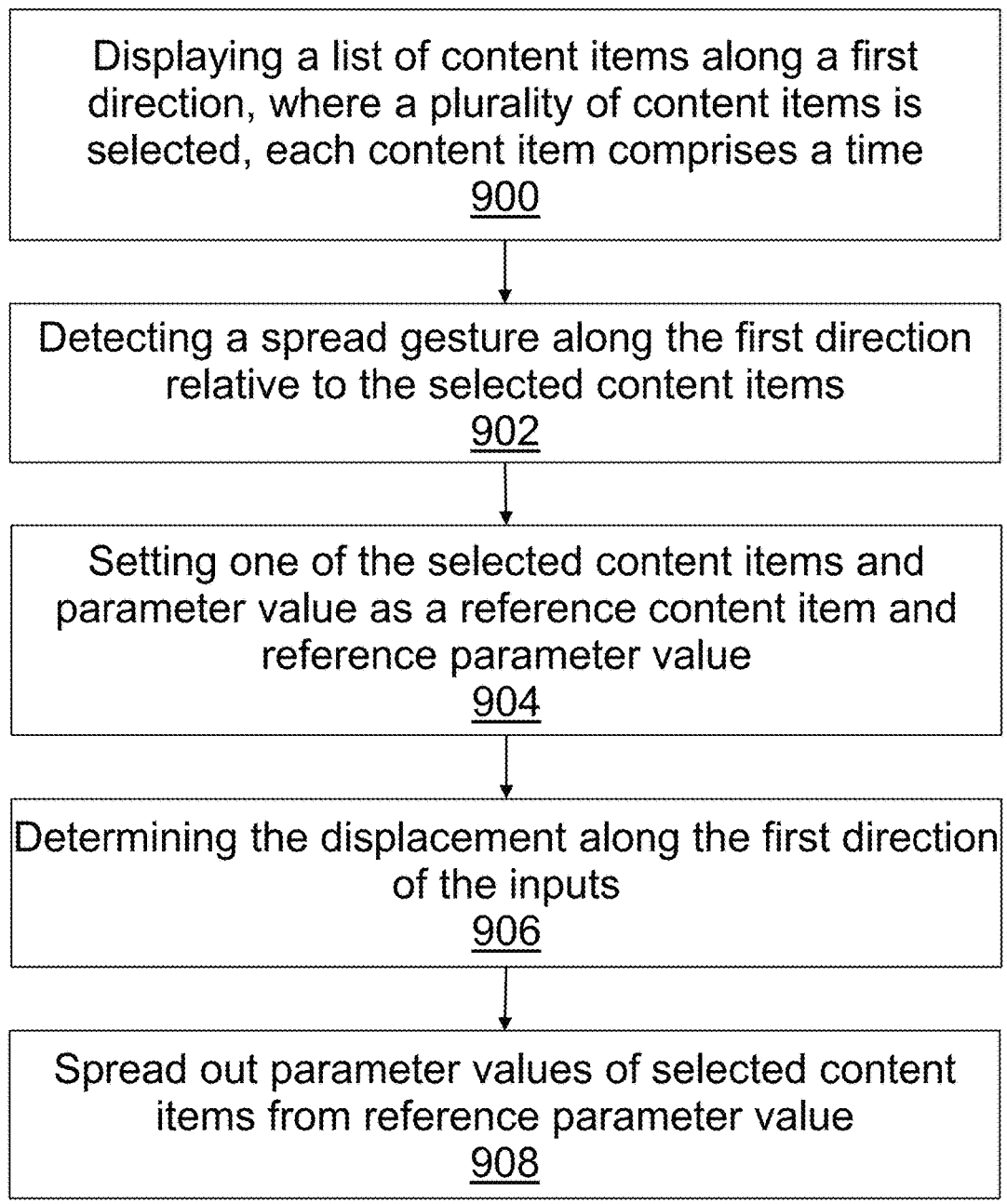
FIG. 9 is a flow diagram of a method of manipulating multiple content items according to another embodiment of the present invention.

FIGS. 8 and 9 describe another method of manipulating the content items according to an embodiment of the present invention. In step 900, the device 800 displays a list of content items along the first direction, with a plurality of content items 604a-604e selected as shown in FIG. 8A, same as that in FIG. 6A of the previous example. In step 902, the device detects a spread gesture along the first direction relative to the selected content items. Then, in step 904, the device sets one of the selected content items as a reference content item, and the parameter value of the reference content item becomes a reference parameter value. In different embodiments, the reference content item is determined by the location of initiation of the gesture, such as by one of the fingers or the mid-point of the fingers. In another embodiment, the reference content item is determined as the first or topmost content item among the selected content items (i.e. 804a), and independent to the location of initiation of the gesture, or it can be the last or most recently selected content item.

In step 906, the device determines the displacement of the inputs along the first direction, similar to the example above. In step 908, the device spreads out the parameter values of the selected content items 806b-806e from the reference parameter value 806a, which means that the parameter values 806b-806e moves away from the reference parameter value 806a and the amount of change of the parameter value for each selected content item increases from the last content item. In an exemplary embodiment, the reference parameter value 806a stays unchanged, and the parameter value of the selected content items changes in a way that a difference between adjacent content items increases across the selected content items. As seen in FIG. 8B, the reference parameter value 806a stays at 1:00 pm. The parameter values 806b-806e is changed such that there is a difference of 45 minutes between adjacent content items, i.e. 1:45 pm, 2:30 pm, 3:15 pm and 4:00 pm. If the displacement of the drag increases such that the difference is determined to be 1 hour, the parameter values 806b-806e will become 2:00 pm, 3:00 pm, 4:00 pm and 5:00 pm.

In an alternative embodiment, the reference content item is determined by the location of initiation, such as 804d in FIG. 8a. In such case, upon detecting the spread gesture, the time 804e will be pushed back from time 804d (e.g. from 1:00 p.m. To 1:45 p.m.), but times 804a-804c will be pushed forward from time 804d (e.g. from 1:00 p.m. To 12:15 p.m. Etc.)

Figure 10A:
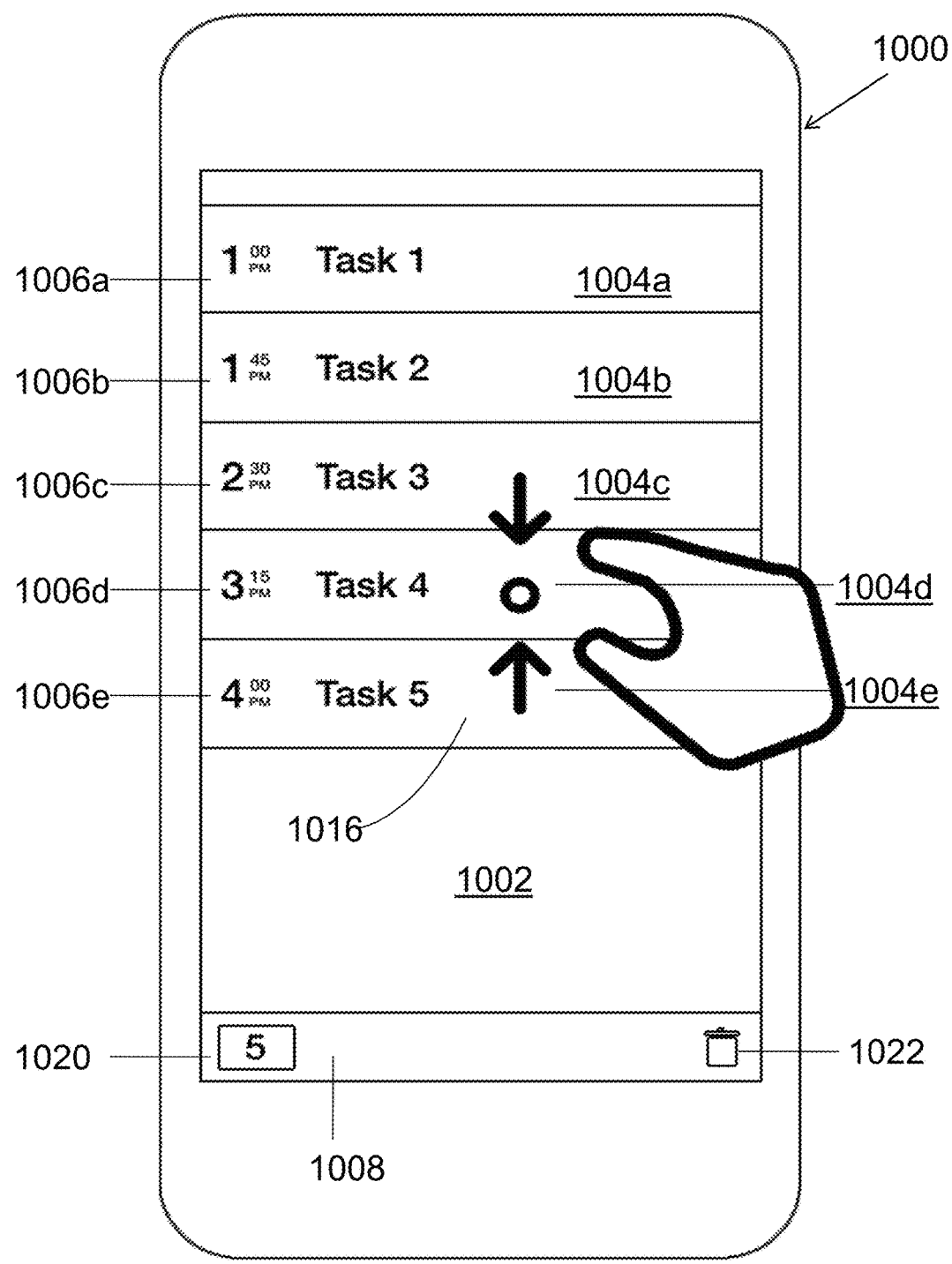
FIG. 10a-10b illustrates a mobile device in a method for manipulating multiple content items according to an embodiment of the present invention.
Figure 10B:
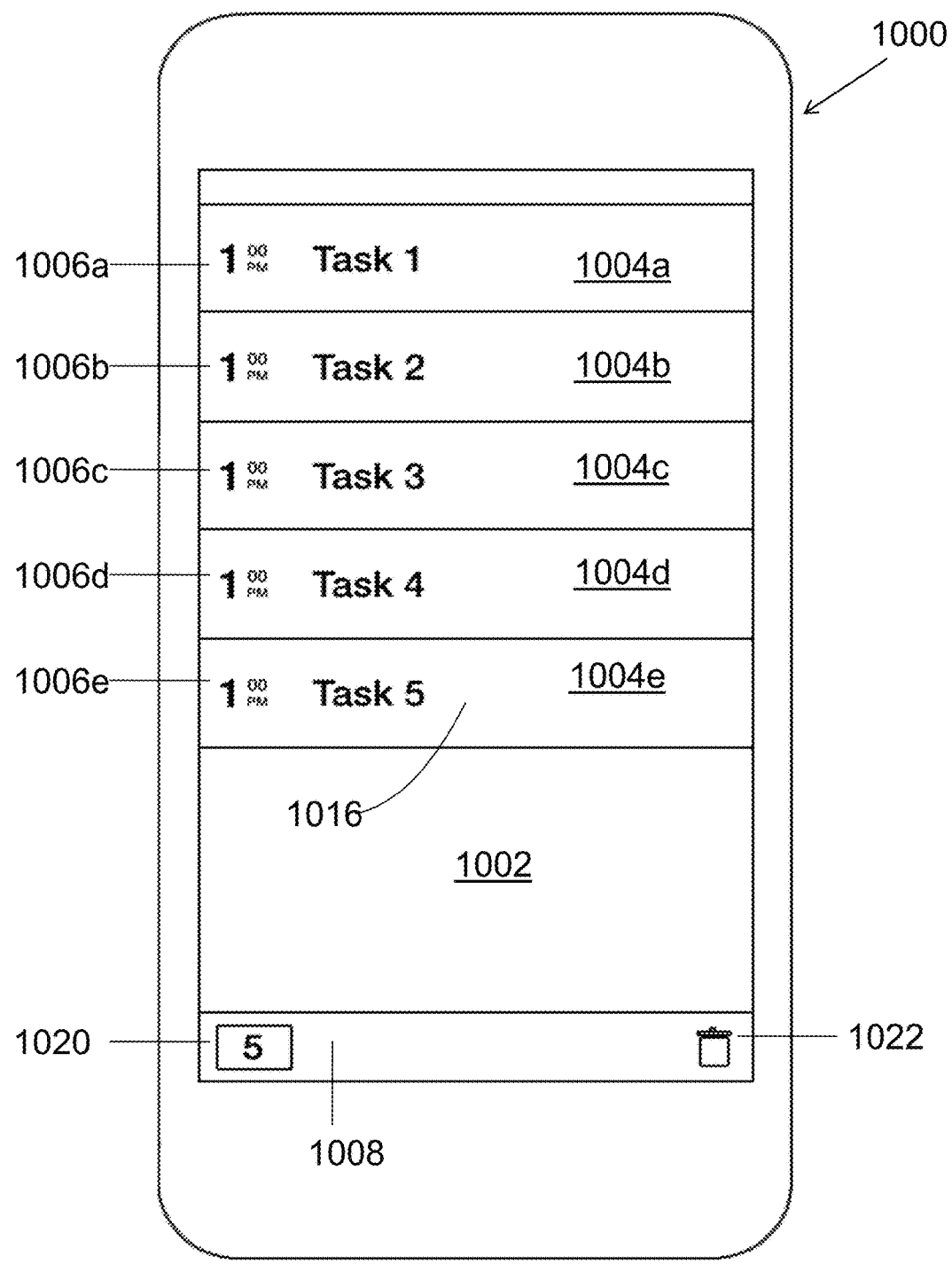
Figure 11:
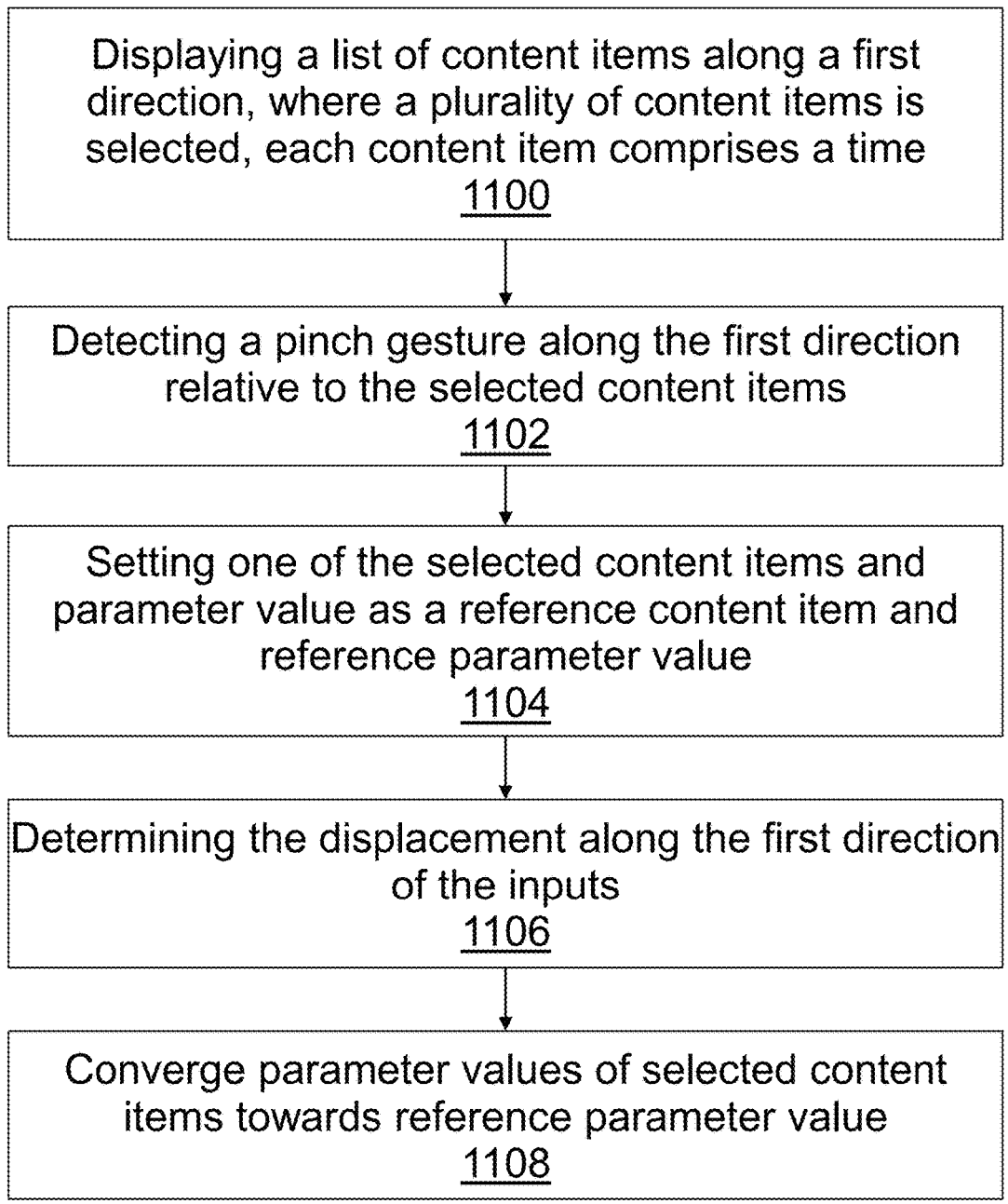
FIG. 11 is a flow diagram of a method of manipulating multiple content items according to another embodiment of the present invention.

Another method of manipulating content items according to the present invention is described in FIGS. 10 and 11. In this method, the gesture is a pinch gesture, and the change of parameter value is basically a reverse of the above embodiment. The parameter values of the selected content items will converge towards the parameter value of the reference content item, as seen in FIG. 10b.

Figure 12:
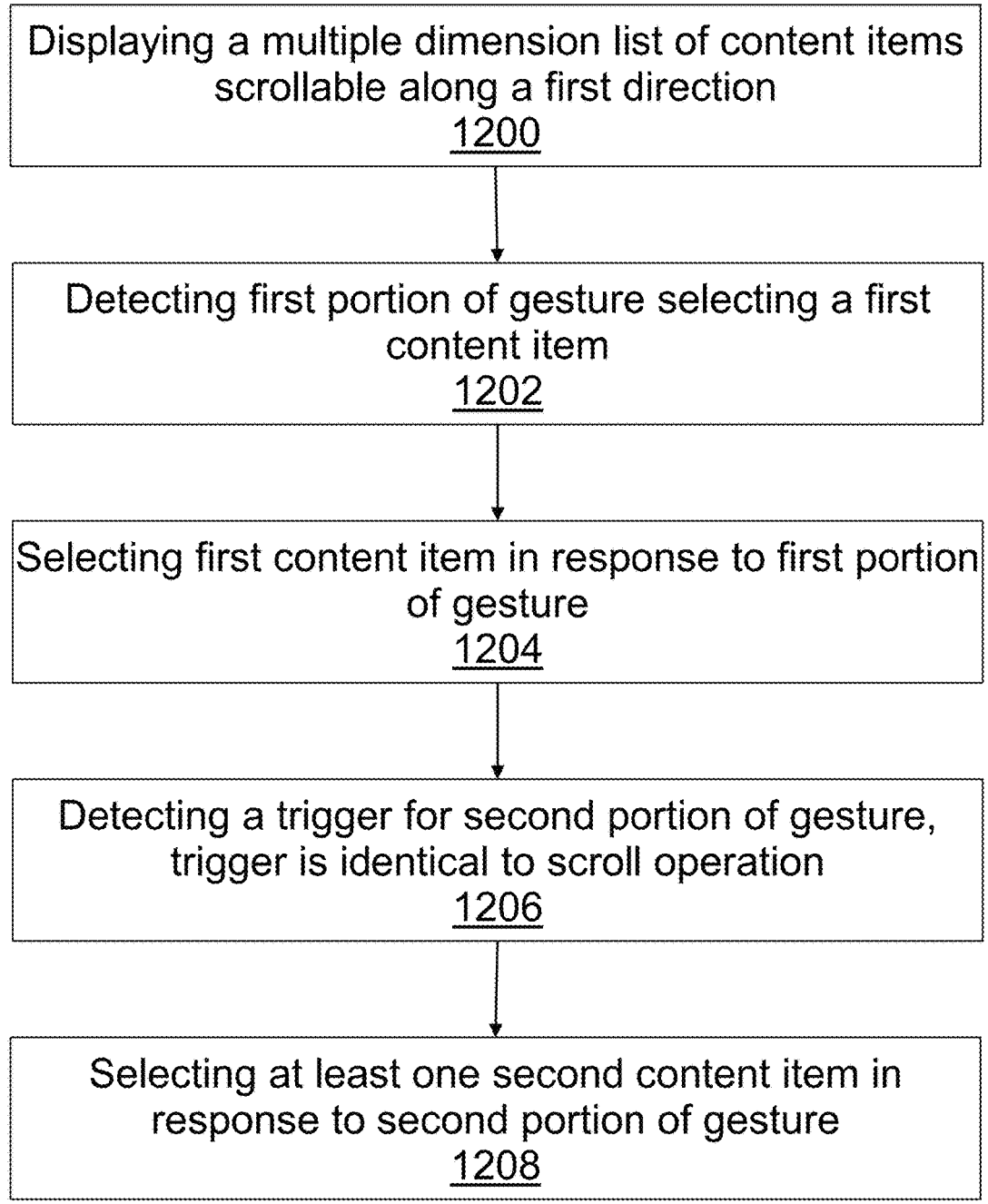
FIG. 12 is a flow diagram of a method of selecting multiple content items in a multiple dimensional list, according to an embodiment of the present invention.

Another embodiment of the present invention for selecting multiple content items in a list of content items is shown in FIGS. 12 to 13. In step 1200, device 1300 displays a scrollable list of content items 1304 on its display 1302. In this embodiment, the list of content items is a multidimensional list instead of a one dimensional list above, meaning that content items 1304 are arranged on the display 1102 in more than one direction. For example, in the embodiment as shown in FIGS. 13A-C the content items are arranged in a tile or grid format, where the content items are arranged in both vertical and horizontal directions, i.e. rows and columns. In the embodiment as shown in FIGS. 13D-E the content items are arranged in a three dimensional format with a depth information in addition to the vertical and horizontal directions.

The list of content items is scrollable in at least a first direction, generally along one of the directions where the content items are arranged. For example, if the content items are arranged in a grid format, the list of content items can be scrollable along the vertical direction, or along the horizontal direction. The list can be made to be scrollable in only the first direction or in all directions where the content items are arranged along. Alternatively, the list of content items is freely scrollable along an arbitrary direction regardless of the direction of arrangement.

Figure 13A:
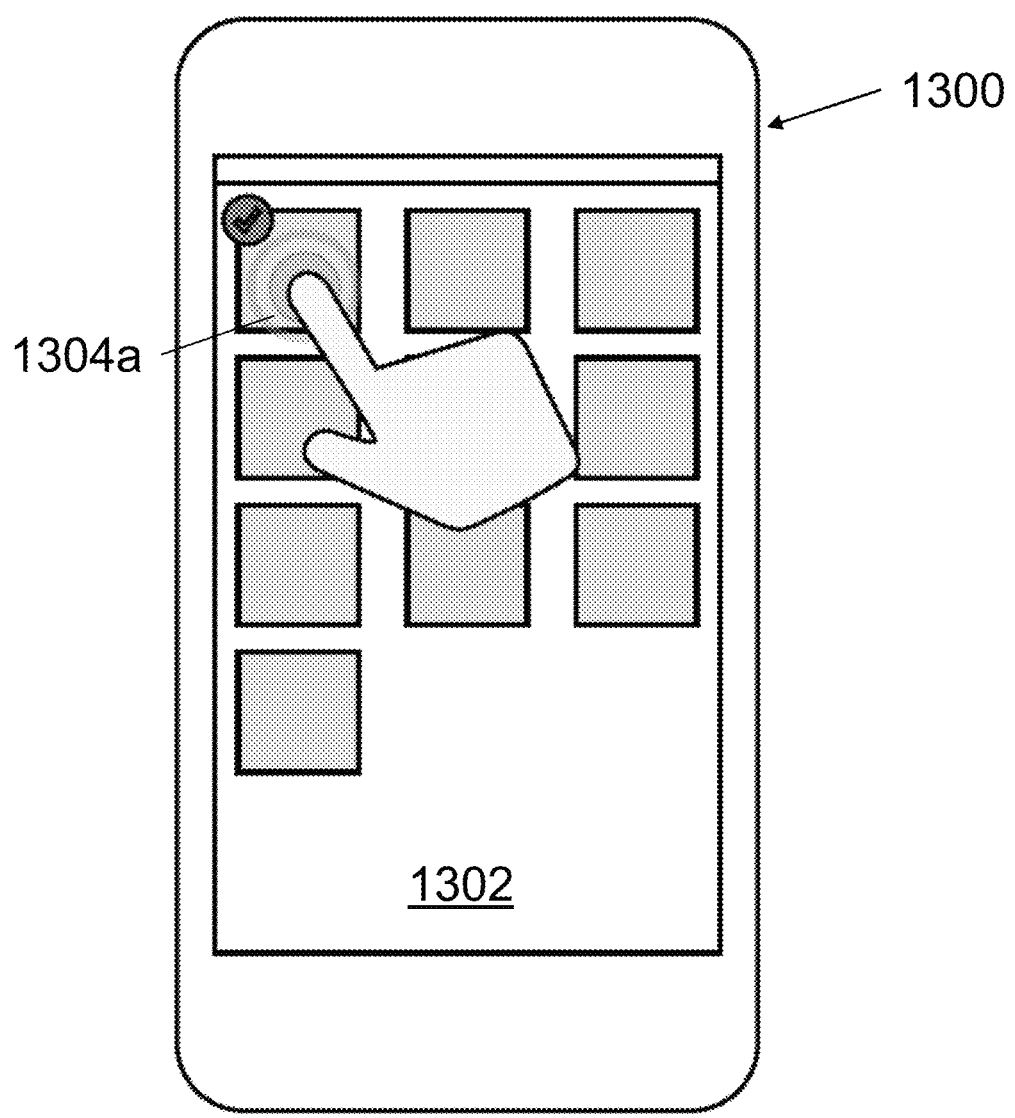
FIG. 13A-B illustrate a device during a method of selecting multiple content items in a two dimensional list, according to an embodiment of the present invention.

In FIG. 13A, the list of content items comprises a gap between adjacent content items, but content items can also be placed immediately adjacent to each other without a presence of the gap. In the case where a gap is present, the gap can display thereon unselectable content such as a wallpaper or information related to a content item such as type and size, or date of creation or modified, or any attributes that are being used to sort the content items. The gap can also display thereon other selectable content such as a content item which belongs to the same list but does not belong to the current page or layer of content items. Rather, the content item belongs to another layer of content items which is selectable with a content item in the current layer with a single gesture, as explained in more detail in the next embodiment.

Figure 13B:
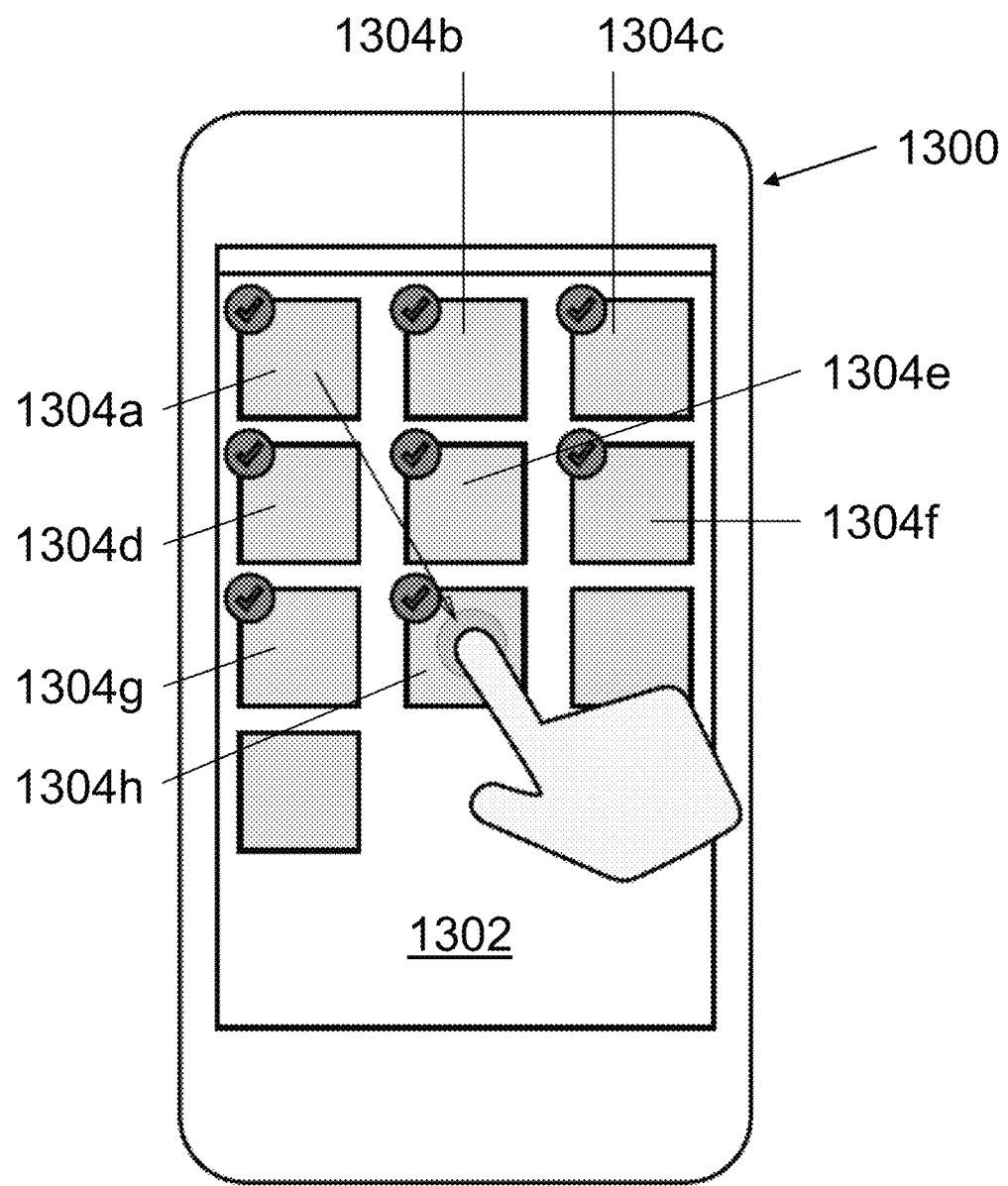
Figure 13C:
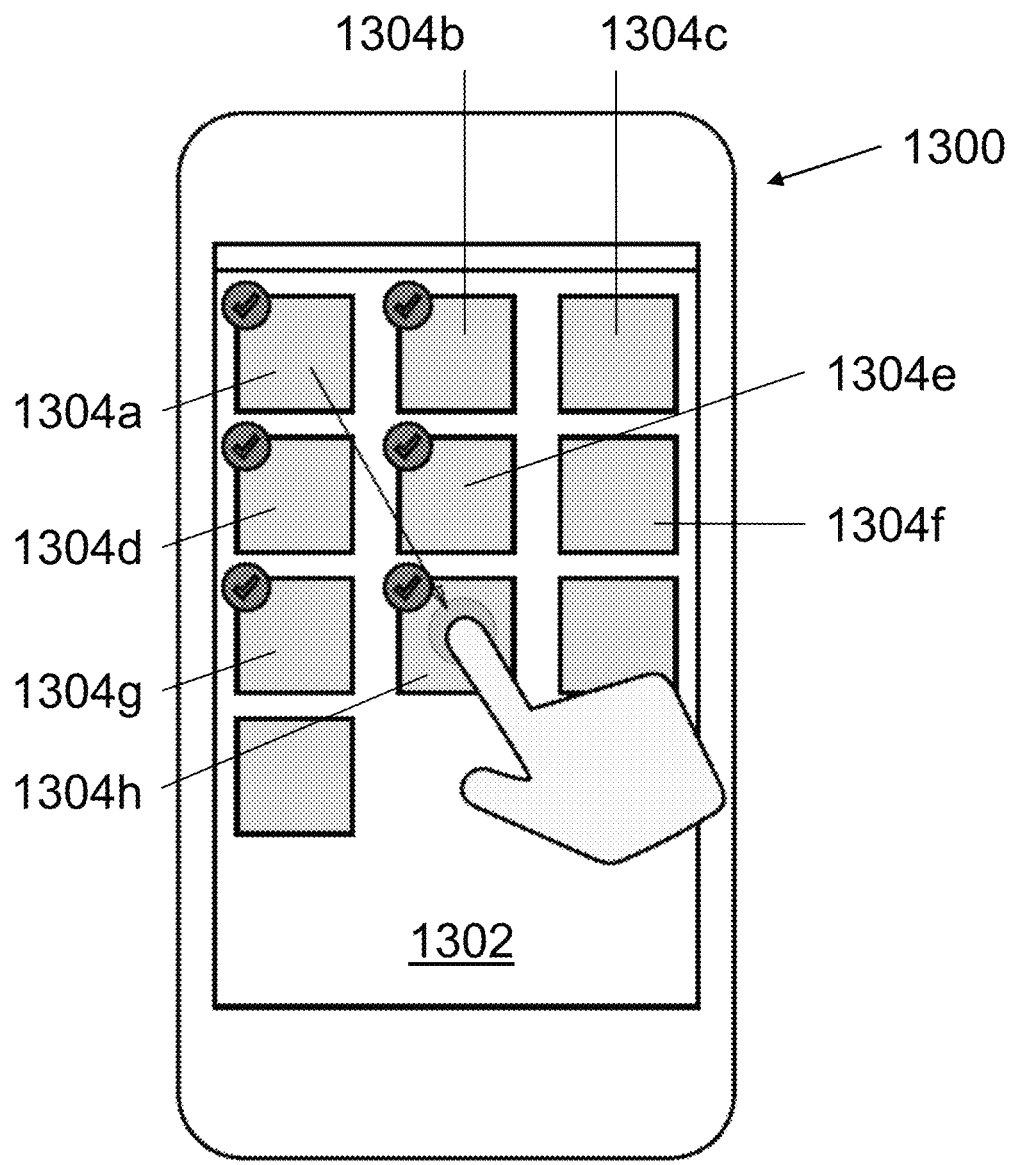
FIG. 13C illustrates the device in FIG. 13A applying an alternative selection method, according to an embodiment of the present invention.
Figure 13D:
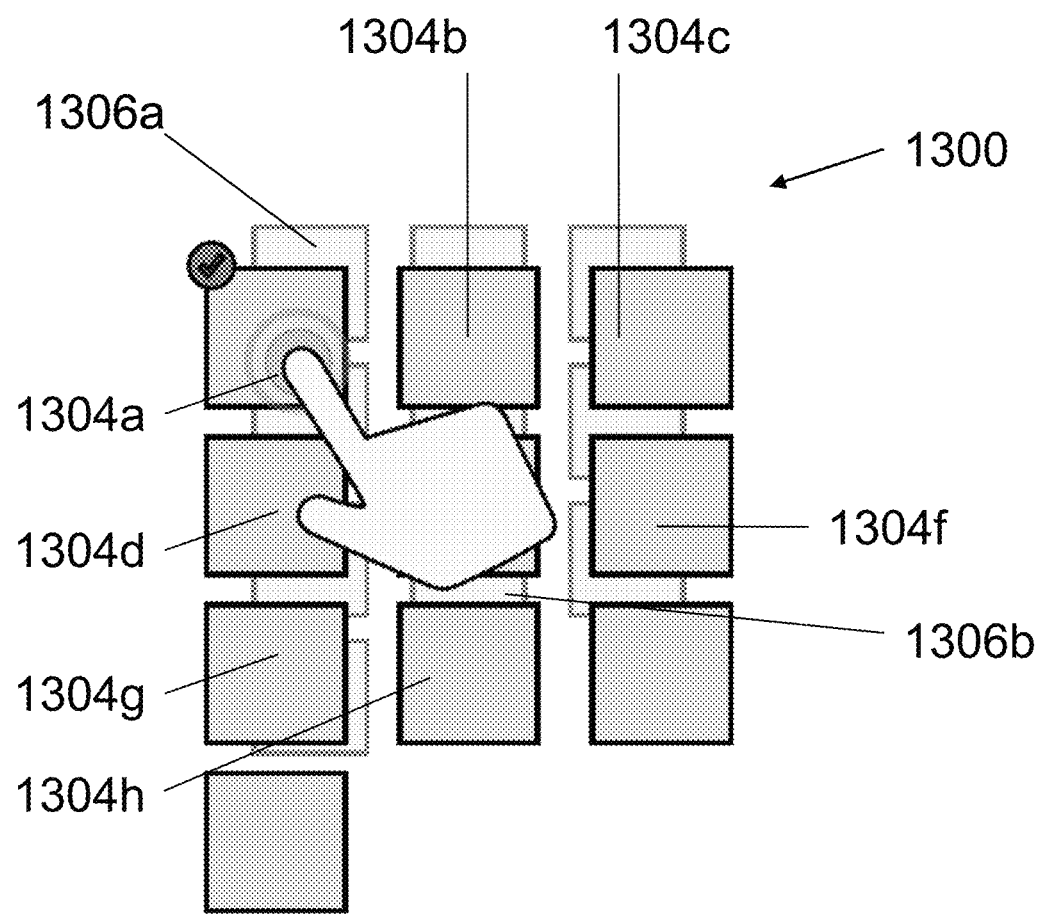
FIG. 13D-E illustrate a device during a method of selecting multiple content items in a three dimensional list, according to an embodiment of the present invention.
Figure 13E:
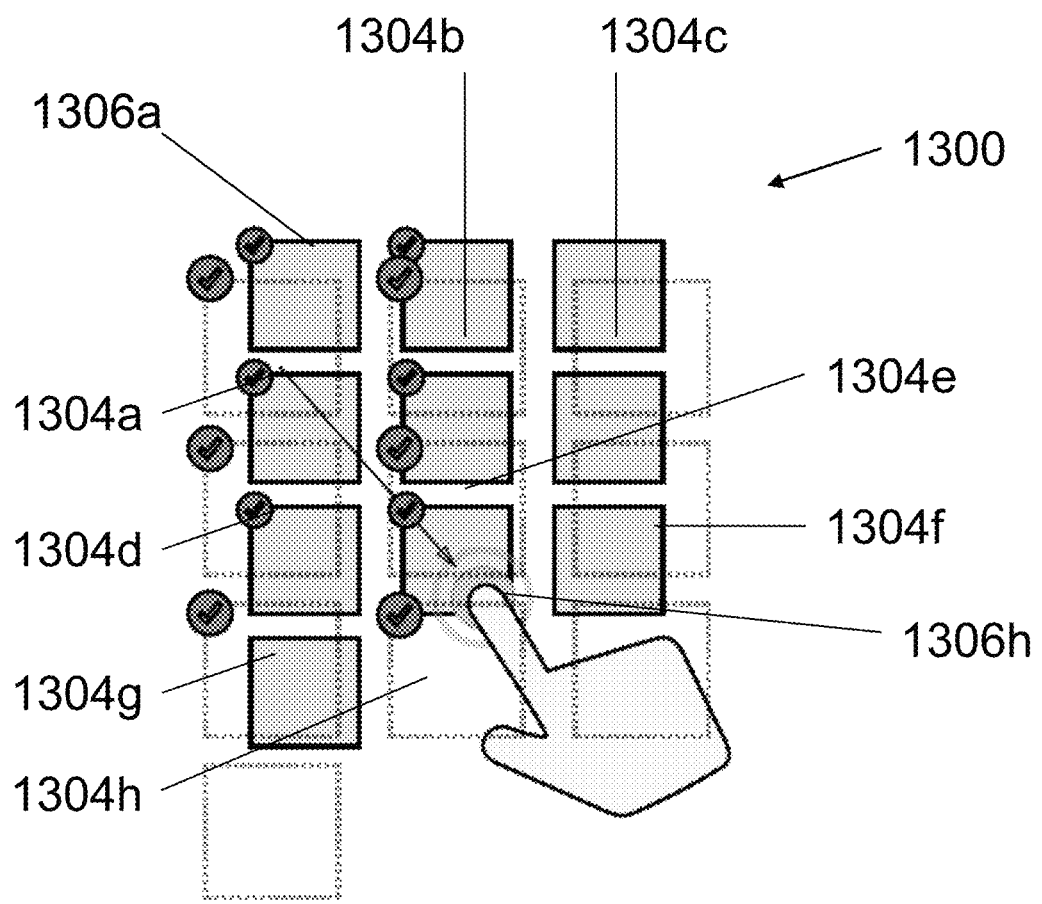

In the embodiment as shown in FIGS. 13D-13E, the content items are further layered in the front-back direction or z-axis addition to being in tile or grid format, meaning that they are arranged in three dimensions. In this embodiment a gap is present between adjacent content items in the same layer, and content items in the next layer is at least partially exposed for selection at the gaps. As shown in the figure, the size of each content item does not need to be the same across different layers, or even within the same layer.

For explanation purposes, the first content item 1304a is defined as the top left content item on the display 1302, as is the same as in previous embodiments. In step 1202, the device 1300 detects a first portion of a gesture selecting the first content item 1304a. Since the list of content items are arranged in multiple directions, the selection of the first content item 1304a can be made by detecting a non-directional input such as tapping, double tapping or tapping and holding the first content item 1304a. The first content item 1304a can also be selected by detecting a initiation of a drag at the first content item 1304a, with the drag running at a direction that is not scrollable before the selection gesture. It is understood to one skilled in the art that selection methods are not limited to physical interaction between the user to the content item, and can also be based on optical or chemical means such as facial recognition, neural synapsis detection, etc.

In step 1204 the device 1300 selects the first content item 1304a in response to the first portion of the gesture, and at the same time the device 1300 disables scrolling of the list of content items along the first direction. When the list of content items is scrollable along more than one directions, the device 1300 can either disable the scroll in all directions or leave the scroll enabled in directions other than the first direction.

In step 1206, the device 1300 then detects a trigger for a second portion of the gesture. In one embodiment, where the first portion of the gesture is a non-directional gesture, the trigger is a drag gesture away from the first content item. The drag can be along one of the directions where the content items are arranged in, or in any direction along the plane of content items. In another embodiment, the drag has a first component along the first direction, where the list of content items is scrollable along if no content items are selected. The scrolling along the first direction is disabled upon the first content item being selected, allowing other content items to be selected with the same gesture when the gesture moves from the first content item to an end point. Furthermore, the scrolling along the first direction can be re-enabled upon detecting the gesture reaching an edge of the screen along the first direction.

In step 1208, the device 1300 selects at least one second content items in response to the second portion of the gesture. For explanation purposes, the second portion of the gesture is a drag in a straight line, ending at content item 1304h. In the embodiment as shown in FIG. 13B, the list of content items are first arranged by an item index thereof, first in rows and then columns. The content items are labeled from 1304a to 1304h to represent the order of item index. The item index can be a sortable attribute of the content item as mentioned above. When the gesture ends at content item 1304h, the content items with item index between that of first content item 1304a and content item 1304h are all selected. It is obvious that the content items can be arranged first in columns and then rows, and the way the content items are arranged is not necessarily dependent to the first direction.

In the embodiment of FIG. 13C, the content items are selected based on the coordinates of the content items on the display. The content items that are within the rectangular area defined by the vertical and horizontal displacement of the drag gesture are selected. As shown in FIG. 13C, the content items 1304a, 1304b, 1304d, 1304e, 1304g and 1304h are selected as the vertical displacement is two rows and the horizontal displacement is one column, but content items 1304c and 1304f are not selected.

Alternatively, the content items can be selected by identifying the content items that the drag gesture passes through along the route of the drag. For example, if the drag gesture first moves from first content item 1304a downwards to content item 1304g then to the right to content item 1304h, only content items 1304a, 1304d, 1304g and 1304h will be selected. This allows a greater freedom for the selection to only select necessary content items comparing with aforementioned index or area selection methods.

In the embodiment as shown in FIG. 13E, only two layers of content items in the list are shown, referred herein as the top layer and the bottom layer respectively. The content items in the top layer are entirely displayed, while the content items in the bottom layer is partially underlayed to a corresponding content item in the top layer.

The selection gesture starts from the first content item 1304a at the top layer. The first content item 1304a can be selected using similar means as mentioned above. The corresponding content item at the bottom layer is labeled as 1306a. The second portion of the gesture then moves from the first content item 1304a to content item 1306h at the bottom layer, which corresponds to content item 1304h at the top layer. In this embodiment, the content items are selected based on area selection, and content items 1304*a*, 1304*b*, 1304*d*, 1304*e*, 1304*g* and 1304*h*, along with their corresponding content items at the bottom layer, are selected by this gesture. In different embodiments, the second portion of the gesture can move directly onto the content item 1306*h* at the bottom layer, or first moving to the content item 1304*h* at the top layer and then changing the layer to the bottom layer to end at content item 1306*h*. The changing of layer can be detected by a continued hold on a content item, an increase of contact area or pressure at the content item, or tapping another button on the display etc.

In an alternative embodiment, instead of partially overlaying the content items in different layers, the device can change the transparency of the content items in different layers in order to show that multiple layers are present in the list. This embodiment can eliminate the need of the presence of a gap between adjacent content items on the same layer in order for the content items in the subsequent layers to be selected.

In one embodiment, when the second portion of the gesture reaches an edge of the display screen in a scrollable direction, scrolling of the list of content items is re-enabled for additional content items to be displayed. In another embodiment, the size of the displayed content items is decreased when the second portion of the gesture reaches the edge, therefore allowing more content items to be displayed for selection. The size decrease does not need to be uniform across the display or by the same ratio along different directions. For example the content items farther away from the current position of the finger can be compressed more than the content items close to the current position of the finger, and content items can be compressed more along a longer edge of the display then along a shorter edge of the display.

In an alternative embodiment of the present invention, the three-dimensional list is made up of stacks of content items instead of layers of content items. Each stack of content items can comprise of a different number of content items, and the stacks of content items can then be arranged in rows or columns or grid formats comprising the first direction. A different number of content items can be selected for each individual stack, for example based on the length of tap detected by the device on each stack. A drag gesture from one stack to another stack would result in selection of a same number of content items selected for multiple stacks within the area or route or index of selection.

In another embodiment of the present invention, the device is capable of displaying information and detecting a gesture in three dimensional space. For example, the device can comprise a three dimensional projection system that projects content items on a three dimensional space, and also comprise a sensing system that senses a specific body, such as a pointer or a finger, in the three dimensional space. The device can be a virtual reality device that presents the content items in a virtual space, and having a sensing system that maps the pointer or finger into a location in the virtual space.

The selection method would be similar as in the above embodiments, where scrolling of the list of content items along an initially scrollable first direction is disabled upon a first content item being selected. The first portion of the selecting gesture can be a non-directional gesture such as a tap, and the second portion can be a straight line from the first content item to an end point with displacements along all three axes. The embodiments of the present invention are fully described above. Although the invention is illustrated in specific embodiments, one skilled in the art would understand that variations and modifications can be made in the details of the implementation without departing from the scope and spirit of the invention. The scope of invention will be construed by the claims below.

For example, the interval can be adjusted by the user. In one embodiment, the gesture for manipulating the parameter values is preceded by a drag orthogonal to the first direction. The distance of the orthogonal drag can be used to determine the interval in the gesture that follows. The current selected interval can be displayed to the user as the drag is in progress.

In another embodiment, the interval is dependent on the number of inputs of the multi-input gesture. For example, a two-finger gesture will result in a smaller interval than a three-finger gesture.

In one embodiment, a limit is set for the parameter values so that when the parameter values are changed using a method described above, the parameter values cannot move over the limit. For example, limits can be set at the beginning of the day and the end of the day, or in pinch gestures, the time of the reference content item.

In one embodiment, the time shift operation can be operated with one input. In an exemplary embodiment, the method detects a single input at a specific area of the content item, for example on the time of the content item. The movement of the finger along the first direction will shift the time of all selected content items by a same amount. In a further embodiment, the interval of the time shift can be adjusted by the user by detecting the finger dragging orthogonal to the first direction by a predetermined distance before moving along the first direction.

Figure 14:
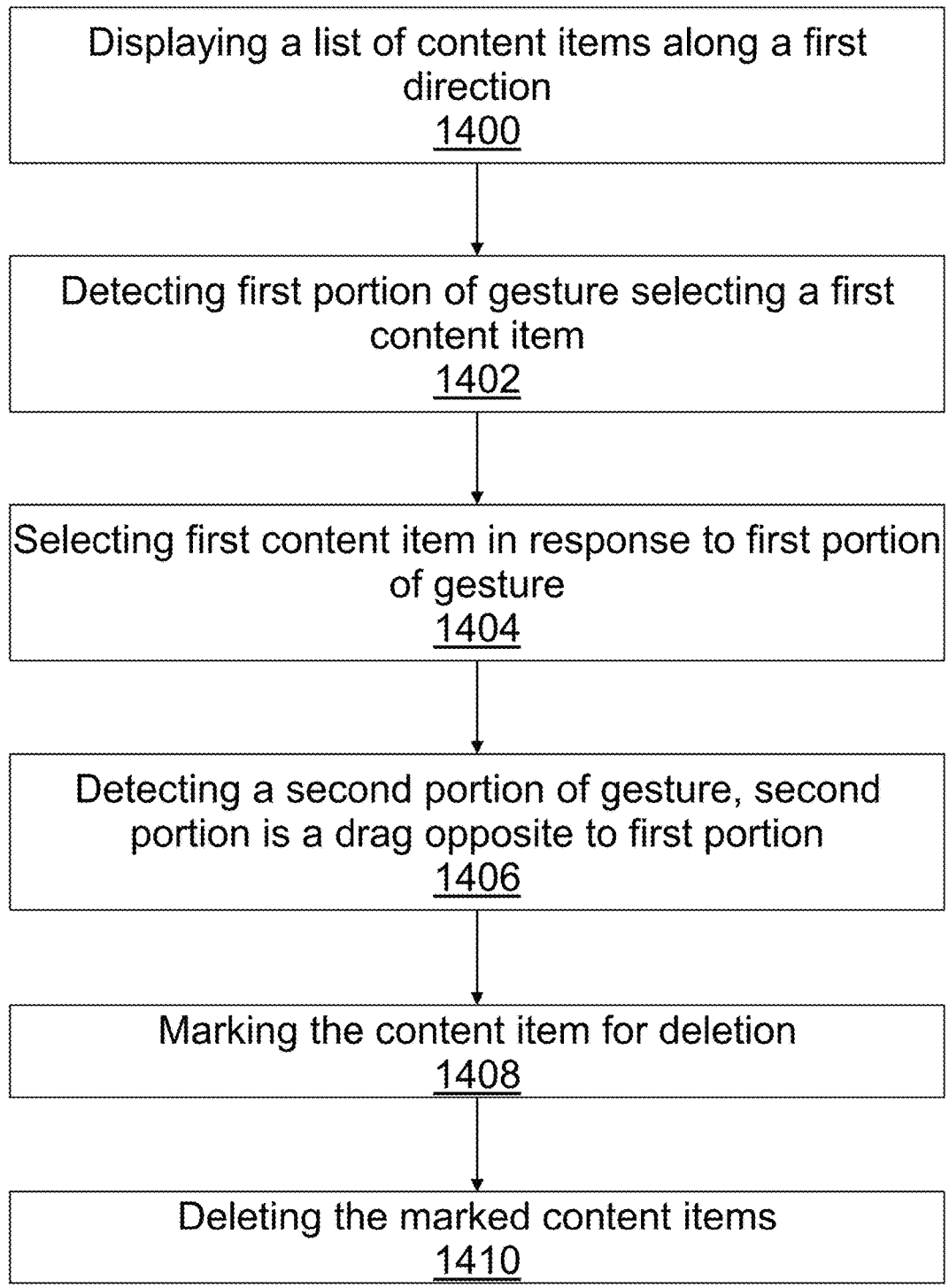
FIG. 14 is a flow diagram of a method of deleting a content item according to an embodiment of the present invention.
Figure 15A:
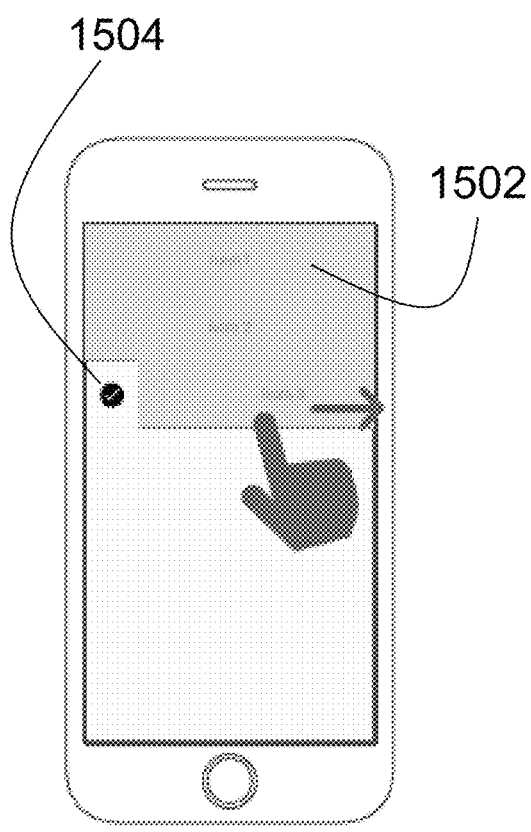
FIG. 15A-B illustrates a mobile device in the method of deleting a content item of FIG. 14.
Figure 15B:
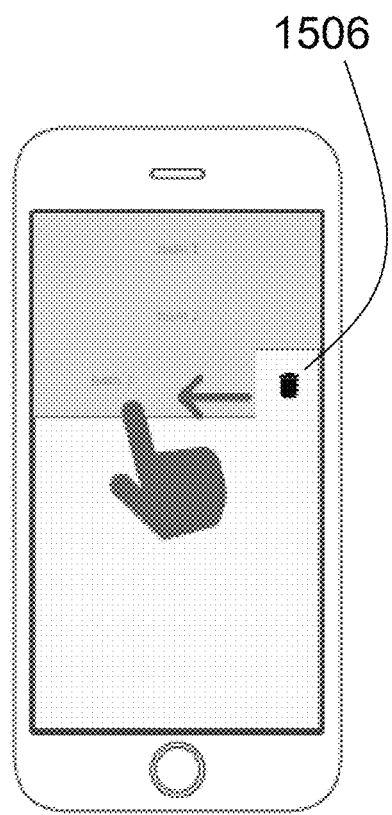
Figure 16:
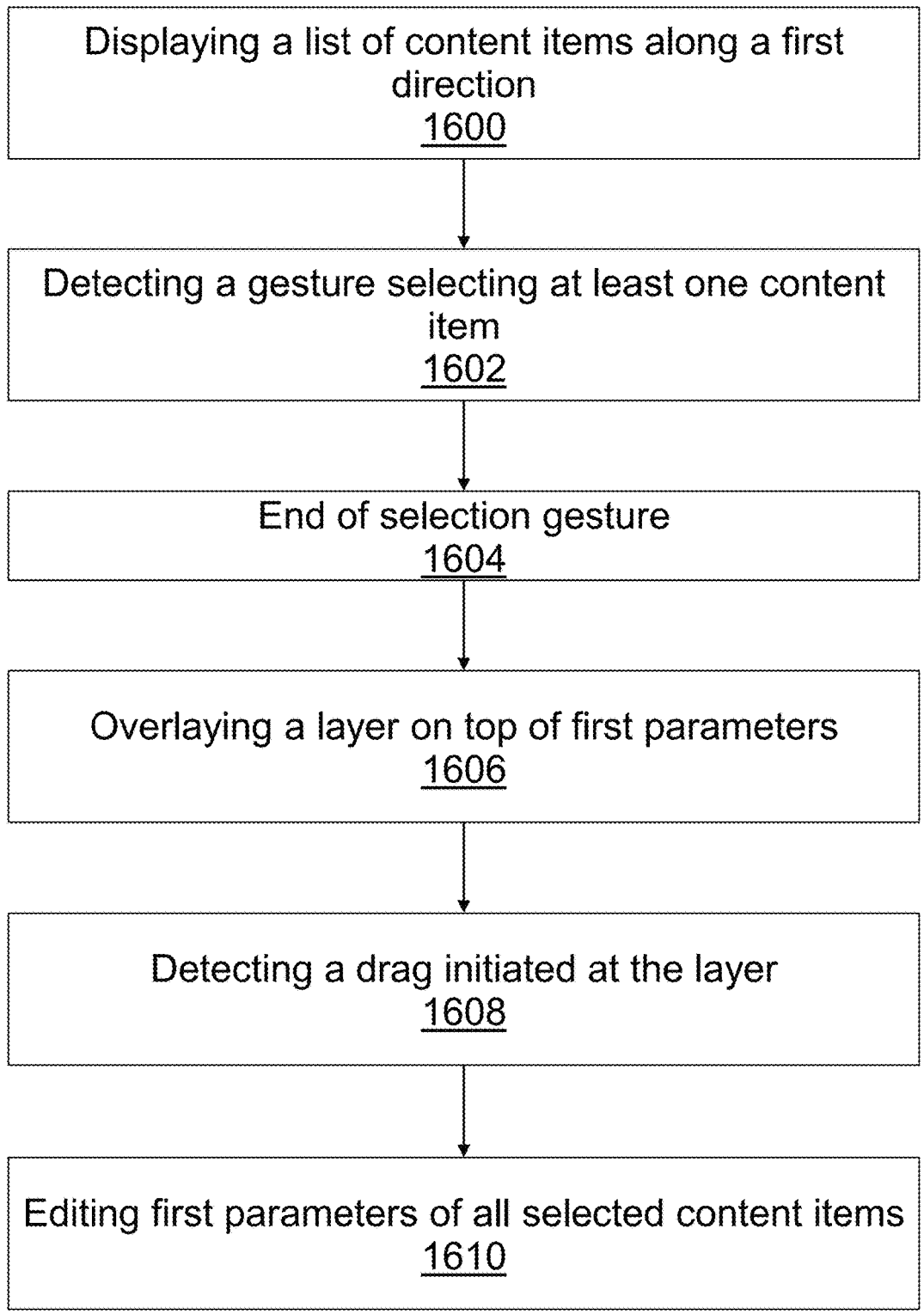
FIG. 16 is flow diagram of a method of simultaneously editing a first parameter of at least one selected content item according to an embodiment of the present invention.

In another aspect of the invention, a method for deleting or removing a content item from a list of content items is provided. Referring to FIGS. 14 and 15*a-b*, the first step of the method 1400 displays a list of selectable content items 1502 on the display of a mobile device, the list of content items comprising at least one content item arranged in a first direction. In step 1402, the method detects a first portion of a gesture that selects a first content item in the list of content items. In this embodiment, the first portion of the gesture is a drag in a direction substantially orthogonal to the first direction, in this case the drag is to the right, but a drag to the left can also achieve the same result. Once the drag travels a predetermined threshold distance, in step 1404 the first content item is selected in response to the first portion of the gesture. A first visual indication can be displayed to indicate that the first content item is selected, such as the tick icon 1504 shown in FIG. 15*a*. If the gesture stops here, the first content item will remain selected and can be further manipulated.

In step 1406, the method then detects a second portion of the gesture, where the second portion of the gesture is a drag or swipe in a directly opposite direction to the first portion of the gesture. Then in step 1408, the first content item is marked for deletion in response to the second portion of the gesture. Similar to the first portion, once the drag travels a predetermined threshold distance, a second visual indication can be displayed to indicate that the first content item is selected for deletion or removal, as shown by the recycle bin icon 1506 in FIG. 15*b*. In a preferred embodiment, the predetermined threshold distance of the second portion is set to be longer than the first portion, for example twice the distance of the first portion. This means that the finger of the user needs to move a significant length further than the starting or original position. In step 1410, the gesture ends and the first content item is deleted from the list of content items. This method provides a simple and intuitive way to delete a content item with a single gesture, while being able to distinguish from other operations to prevent accidental triggering.

In a further embodiment, the method further comprises the step of detecting a third portion of the gesture. The third portion of the gesture is a drag substantially along the first direction and orthogonal to the drags of the first and the second portions. The third portion of the gesture moves over at least one second content item in the list of content items. In one embodiment, the step of detecting the third portion of the gesture is performed after selecting the first content item and before marking the first content item for deletion. While the first content item is selected, the device will select the at least one second content item as well as the first content item upon detecting the third portion of the gesture. Afterwards, the device detects the second portion of the gesture, where all selected content items are then marked for deletion at the same time. All marked content items are then deleted from the list of content items once the gesture is completed.

In another embodiment, the step of detecting the third portion of the gesture is performed after the second portion is complete, i.e. after the first content item is marked for deletion. When the third portion of the gesture moves over the at least one second content item, the at least one second content item will be also marked for deletion, same as the first content item. Same as above, all marked content items are then deleted from the list of content items once the gesture is completed.

Figures 17A, 17B:
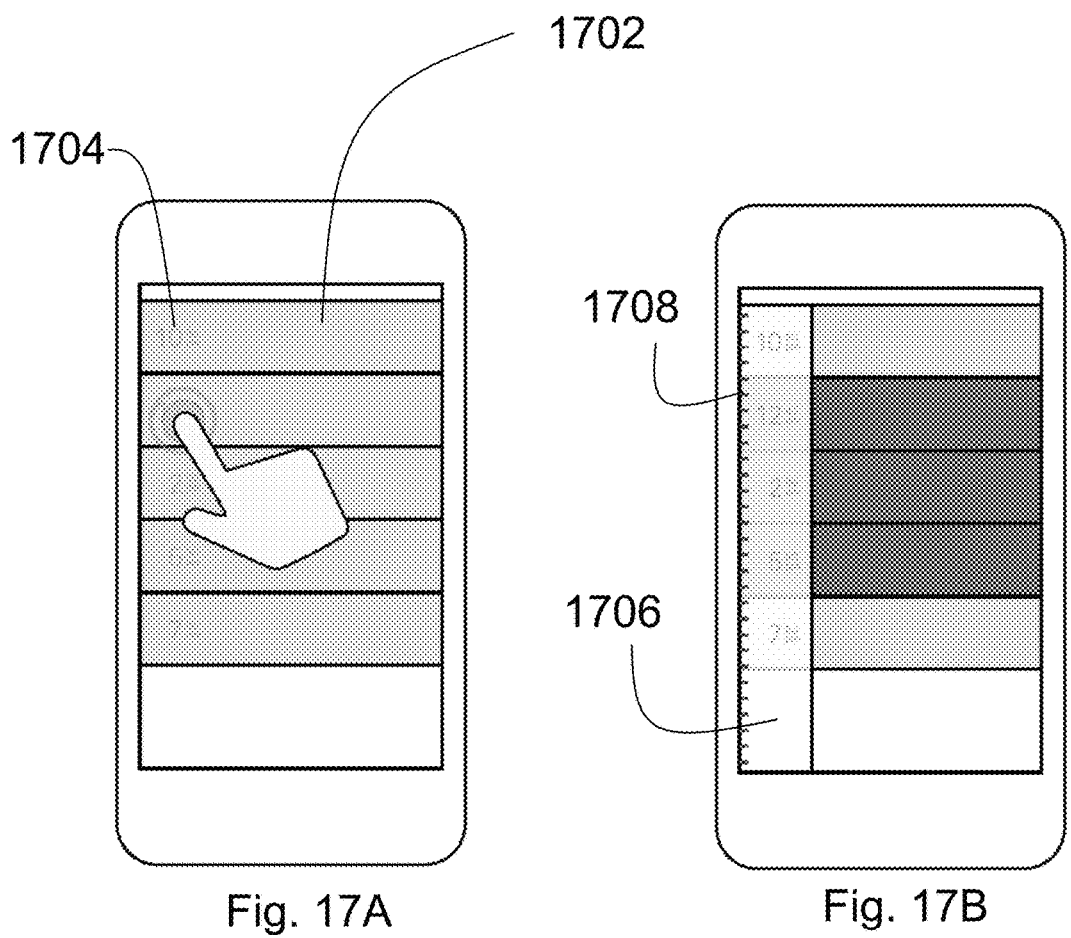
FIGS. 17A-C illustrate a mobile device in the method of simultaneously editing of parameter of FIG. 16
Figure 17C:
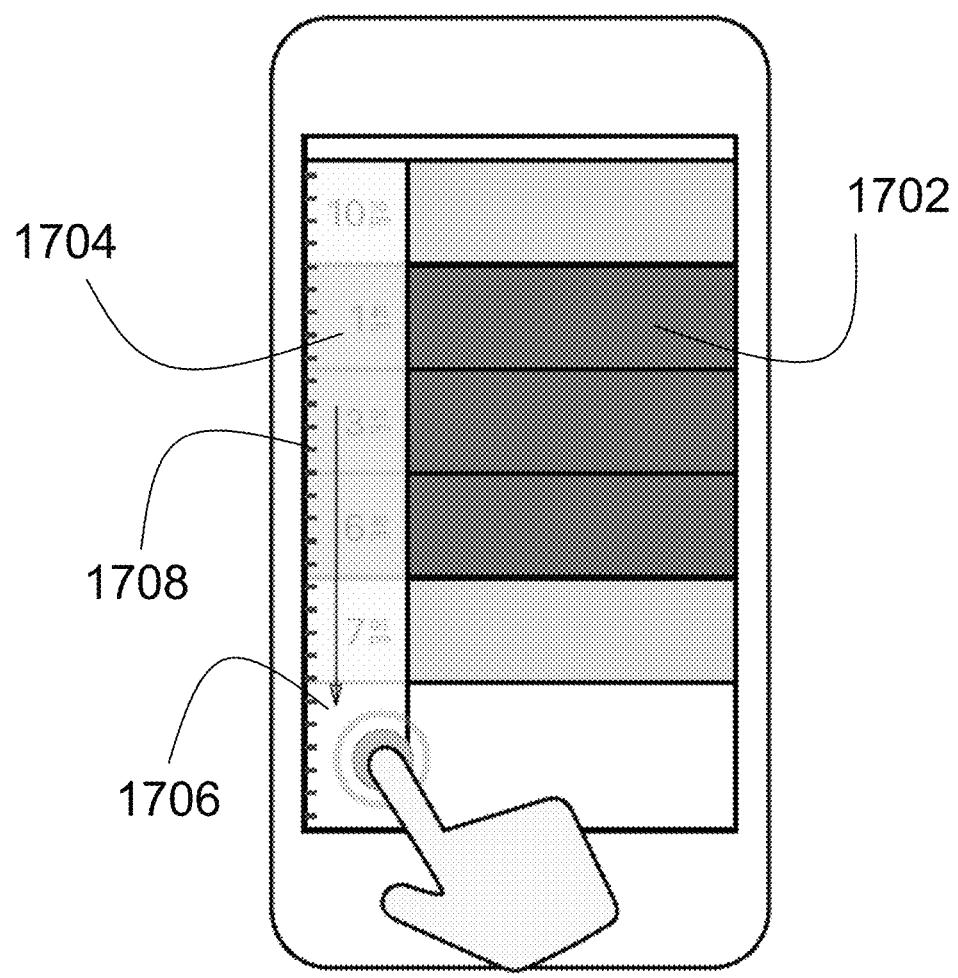

In another aspect of the invention, a method of simultaneously editing a parameter of at least one content item in a list of content items is provided. Referring now to FIGS. 16 and 17A-C, in step 1600 the method first displays a list of content items 1702 on a display of a mobile device. The content items 1702 are arranged in a first direction, as in previous embodiments. In step 1602, detects a selection of at least one content item 1702 in a list of content items. The selection can be performed by the method as described above, or by other contemporary methods such as tapping or dragging on individual content items. Each content item 1702 in the list comprises a first parameter 1704, the first parameter 1704 is initially not editable. In a preferred embodiment, the first parameter 1704 being a time associated to the content item. In other various embodiments the parameter is a numerical value or an alphabetical entry. The content items in the list can be sorted based on the first parameter. In FIG. 17*b* the selected content items are shown in a darker shade than the unselected content items. The selection gesture is complete in step 1604.

In step 1606, upon detecting an end of the selection gesture an indication layer 1706 is overlaid on the first parameters 1704 of the content items 1702. The indication layer 1706 when overlaid on the first parameters 1704 flags the first parameters 1704 to be editable by the user. In this example, the first parameters 1704 are aligned to the left side of the display, so the indication layer 1706 when overlaid has an appearance of a vertical bar with grid 1708 that resembles a ruler at left side of the display. The grid 1708 can be set to assume a specific relationship with the content item 1702, for example the height of the content item 1702 can be sized based on the time associated to the content item 1702, and so the grid 1708 can allow the user to easily recognize the approximate time associated to each content item 1702 in a more visually instinctive manner. As shown in FIG. 17*b*, the indication layer 1706 traverses through the whole display, even if the content items 1702 do not cover the whole area. In other embodiments, the indication layer 1706 can result in the first parameters 1704 being highlighted in a different color, or generate a blinking effect to visually alert the user.

After the selection gesture is completed, in step 1608, the method detects a drag gesture initiated at any point on the indication layer 1706. In step 1610, upon completion of the drag gesture, the first parameters of all selected first parameters 1704 are edited simultaneously. Referring to the example in FIG. 17B-C, the selected first parameters 1704 were 12:45 pm, 2:00 pm and 5:30 pm respectively, but are all delayed uniformly by 1 hour after detecting the downward drag. The shift can be the same across all selected first parameters 1704, or can have a predetermined relationship determined based on the first parameter 1704 and a direction of the drag etc. In a further example, the drag gesture comprises a first portion that runs substantially orthogonal to the content item for determining a rate of change of the first parameter, such as in 15-minute intervals or 1-hour intervals. The drag gesture also comprises a second portion that runs substantially perpendicular to the content item for determining a direction and a magnitude of change of the first parameters. The second portion can be a straight drag or can be spread or pinch gestures.

What is claimed is:

1. A method comprising:
    displaying a list of content items on a display of a computing device, said list of content items comprising a plurality of content items arranged in a first direction;
    detecting a first portion of a gesture selecting a first content item in said list of content items;
    while said first content item is selected, detecting a second portion of said gesture;
    marking said first content item for deletion in response to said second portion of said gesture;
    deleting said first content item from said list of content items upon completion of said gesture;
    wherein said first portion of said gesture is a drag in a direction substantially orthogonal to said first direction, and said second portion of said gesture is a drag in a direction directly opposite to said first direction.

2. The method according to claim 1, further comprising the step of displaying a first visual indication for indicating said first content item is selected upon detecting said first portion of said gesture.

3. The method according to claim 1, further comprising the step of displaying a second visual indication for indicating said first content item is selected to be removed upon detecting said second portion of said gesture.

4. The method according to claim 1, further comprising the steps of:
    detecting a third portion of said gesture while said first content item is selected, wherein said third portion of said gesture is a drag in a direction substantially along first direction, said third portion of said gesture moving over at least one second content item in said list of content items;
    selecting said at least one second content item along with said first content item upon detecting said third portion of said gesture;
    wherein said first content item and said at least one second content item are removed from said list of content items upon completion of said gesture.

5. The method according to claim 4, wherein said step of detecting said third portion of said gesture is performed after said step of detecting said first portion of said gesture and before said step of detecting said second portion of said gesture.

6. The method according to claim 4, wherein said step of detecting said third portion of said gesture is performed after said step of detecting said second portion of said gesture.

7. The method according to claim 1, wherein said list of content items is scrollable along said first direction, further comprising the step of disabling scrolling along said first direction while said first content item is selected.

8. A method comprising:
displaying a list of content items on a display of a computing device, said list of content items comprising a plurality of content items arranged in a first direction, each said content item comprises a first parameter where said first parameter of the list of content items is displayed in an aligned configuration, said first parameter is initially not editable;
detecting a selection of at least one of said plurality of content items;
overlaying an indication layer on top of said displayed first parameters of said list of content item, wherein said first parameter of said at least one selected content item is flagged as editable upon overlaying of said indication layer;
detecting a drag gesture initiated on said first parameter of said at least one selected content item;
editing said first parameter of said at least one selected content item simultaneously upon completion of said drag gesture.

9. The method according to claim 8, wherein said first parameter is a length of a time period associated to said content item.

10. The method according to claim 8, wherein a rate of change of said first parameter of said at least one selected content item is uniform across said at least one selected content item.

11. The method according to claim 8, wherein said drag gesture comprises a first portion running substantially parallel to said content item, said first portion determines a rate of change of said first parameter of said at least one selected content item.

12. The method according to claim 8, wherein said drag gesture comprises a second portion substantially perpendicular to said content item, said second portion determines a direction and a magnitude of change of said first parameter of said at least one selected content item.

* * * * *